(12) United States Patent
Deshpande et al.

(10) Patent No.: US 11,640,741 B2
(45) Date of Patent: May 2, 2023

(54) BEVERAGE CONTAINER DISPENSER AND METHOD FOR DISPENSING BEVERAGE CONTAINERS

(71) Applicant: PepsiCo, Inc., Purchase, NY (US)

(72) Inventors: Prashant Deshpande, Gurgaon (IN); Gurmeet Singh Bhutani, Gurgaon (IN); Brian D. Kelly, Scotch Plains, NJ (US); Wilton Brown, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/820,423

(22) Filed: Mar. 16, 2020

(65) Prior Publication Data
US 2020/0312078 A1    Oct. 1, 2020

(30) Foreign Application Priority Data

Mar. 25, 2019 (IN) .............................. 201941011449

(51) Int. Cl.
*G07F 11/72* (2006.01)
*G07F 9/02* (2006.01)
(Continued)

(52) U.S. Cl.
CPC ............. *G07F 9/023* (2013.01); *A23G 9/045* (2013.01); *G07F 9/105* (2013.01); *G07F 11/72* (2013.01); *G07F 17/0071* (2013.01)

(58) Field of Classification Search
CPC ...... G07F 11/72; G07F 17/0071; G07F 9/105; G07F 9/023
See application file for complete search history.

(56) References Cited

U.S. PATENT DOCUMENTS 1,023,116 A    4/1912   Bailey
2,250,557 A    7/1941   Tull
(Continued)

FOREIGN PATENT DOCUMENTS

AR         27183 A1     3/2003
AU    1999039425 A    12/1999
(Continued)

OTHER PUBLICATIONS

International Search Report and Written Opinion of the International Searching Authority in International Application No. PCT/US2020/22982, dated Jul. 28, 2020 (10 pages).
(Continued)

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A method for dispensing a beverage container to a consumer. The method includes receiving in a beverage container dispenser a first beverage container that contains a beverage corresponding to a beverage selection of a user. The method further includes dispensing a second beverage container containing the beverage from a temperature-regulated compartment of the beverage container dispenser. The second beverage container that is dispensed from the temperature-regulated compartment corresponds to the beverage selection of the user.

24 Claims, 17 Drawing Sheets

(51) Int. Cl.
  *A23G 9/04* (2006.01)
  *G07F 9/10* (2006.01)
  *G07F 17/00* (2006.01)

(56) References Cited

U.S. PATENT DOCUMENTS

| | | | |
|---|---|---|---|
| 2,260,643 A | 10/1941 | Rosan | |
| 2,266,025 A | 12/1941 | Grau | |
| 2,371,845 A | 3/1945 | Robison | |
| 2,496,304 A | 2/1950 | Muffly | |
| 2,671,001 A | 3/1954 | Ossanna, Jr. | |
| 2,711,241 A | 6/1955 | Abrahamsen | |
| 2,935,225 A | 5/1960 | Jordan et al. | |
| 2,956,660 A | 10/1960 | Nordquist | |
| 3,055,548 A | 9/1962 | Allegri | |
| 3,231,323 A | 1/1966 | Wells et al. | |
| 3,359,748 A | 12/1967 | Booth | |
| 3,410,452 A | 11/1968 | Igel et al. | |
| 4,248,358 A | 2/1981 | Muench | |
| 4,287,992 A | 9/1981 | Takemori | |
| 4,411,351 A | 10/1983 | Lowder et al. | |
| 4,687,119 A | 8/1987 | Juillet | |
| 4,823,984 A | 4/1989 | Ficken | |
| 4,920,763 A | 5/1990 | Provest et al. | |
| 5,009,329 A | 4/1991 | Farrentine | |
| 5,201,191 A | 4/1993 | Bustos | |
| 5,222,624 A * | 6/1993 | Burr | G07C 15/005 221/1 |
| 5,237,835 A | 8/1993 | Brochier | |
| 5,247,798 A | 9/1993 | Collard | |
| 5,248,102 A | 9/1993 | Bohn | |
| 5,303,214 A | 4/1994 | Kulakowski et al. | |
| 5,335,818 A | 8/1994 | Maldanis et al. | |
| 5,499,707 A | 3/1996 | Steury | |
| 5,671,604 A | 9/1997 | Rudick | |
| 5,689,967 A | 11/1997 | Fløysvik | |
| RE35,743 E | 3/1998 | Pearson | |
| 5,890,622 A | 4/1999 | Farmont | |
| 5,960,988 A | 10/1999 | Freixas | |
| 5,988,428 A | 11/1999 | Lauer | |
| 6,059,145 A | 5/2000 | Stratton et al. | |
| 6,073,460 A | 6/2000 | Credle et al. | |
| 6,085,534 A | 7/2000 | Anthony | |
| 6,158,227 A | 12/2000 | Seeley | |
| 6,173,582 B1 | 1/2001 | Hixson | |
| RE37,213 E | 6/2001 | Staggs | |
| 6,273,292 B1 | 8/2001 | Milan | |
| 6,389,822 B1 | 5/2002 | Schanin | |
| 6,390,328 B1 | 5/2002 | Obermeier et al. | |
| 6,511,693 B2 | 1/2003 | Jones | |
| 6,598,789 B1 | 7/2003 | Matsumoto et al. | |
| 6,609,391 B2 | 8/2003 | Davis | |
| 6,862,896 B1 | 3/2005 | Seidl | |
| 6,968,975 B2 | 11/2005 | Christensen | |
| 7,150,155 B2 | 12/2006 | Faber | |
| 7,377,123 B2 | 5/2008 | Byrne et al. | |
| 7,559,482 B2 | 7/2009 | Coveley | |
| 7,596,964 B2 | 10/2009 | Lim et al. | |
| 7,621,139 B2 | 11/2009 | Ha et al. | |
| 7,824,725 B2 | 11/2010 | Pfister | |
| 8,028,855 B2 | 10/2011 | White et al. | |
| 8,132,960 B2 | 3/2012 | Zhuang | |
| 8,151,577 B2 | 4/2012 | Bucceri | |
| 8,151,598 B2 | 4/2012 | Wittern, Jr. et al. | |
| 8,161,756 B2 | 4/2012 | Kutta et al. | |
| 8,360,272 B2 | 1/2013 | Piersant et al. | |
| 8,433,440 B2 | 4/2013 | Felique et al. | |
| 8,442,674 B2 | 5/2013 | Tilton et al. | |
| 8,464,544 B2 | 6/2013 | Shin et al. | |
| 8,863,649 B1 | 10/2014 | Rao et al. | |
| 8,899,280 B2 | 12/2014 | Deo et al. | |
| 9,280,271 B2 | 3/2016 | Hoog et al. | |
| 9,475,685 B2 | 10/2016 | Davenport et al. | |
| 9,514,595 B2 | 12/2016 | Agon et al. | |
| 2002/0005043 A1 | 1/2002 | Rudick et al. | |
| 2002/0124576 A1 | 9/2002 | Loibl et al. | |
| 2003/0218023 A1 | 11/2003 | Zangari et al. | |
| 2004/0026446 A1 | 2/2004 | Mori et al. | |
| 2005/0056047 A1 | 3/2005 | Carmichael et al. | |
| 2005/0234590 A1 | 10/2005 | Sato et al. | |
| 2007/0012066 A1 | 1/2007 | Kaplan | |
| 2007/0106422 A1 | 5/2007 | Jennings et al. | |
| 2007/0163275 A1 | 7/2007 | Ha et al. | |
| 2007/0163289 A1 | 7/2007 | Hahm et al. | |
| 2008/0011765 A1 | 1/2008 | Marquez | |
| 2008/0066506 A1 | 3/2008 | Carbajal et al. | |
| 2008/0245079 A1 | 10/2008 | Lim et al. | |
| 2008/0245081 A1 | 10/2008 | Shin et al. | |
| 2008/0245820 A1 | 10/2008 | Pfister et al. | |
| 2009/0000312 A1 | 1/2009 | Smith et al. | |
| 2009/0029016 A1 | 1/2009 | Pfister et al. | |
| 2009/0076650 A1 | 3/2009 | Faes | |
| 2009/0179042 A1 | 7/2009 | Milan et al. | |
| 2009/0236954 A1 | 9/2009 | Kobayashi et al. | |
| 2010/0058776 A1 | 3/2010 | Loibl et al. | |
| 2010/0242497 A1 | 9/2010 | Bertone | |
| 2010/0294618 A1 * | 11/2010 | Jennison | G07F 13/02 194/350 |
| 2010/0319363 A1 | 12/2010 | Dieckmann | |
| 2011/0006074 A1 | 1/2011 | Machers | |
| 2011/0186591 A1 | 8/2011 | Pfister | |
| 2011/0239675 A1 | 10/2011 | Roekens | |
| 2012/0173016 A1 | 7/2012 | Piersant et al. | |
| 2012/0277904 A1 * | 11/2012 | Pritchard | G07F 9/02 700/232 |
| 2013/0026174 A1 * | 1/2013 | Yuyama | G07F 11/00 221/2 |
| 2013/0087050 A1 | 4/2013 | Studor et al. | |
| 2013/0233914 A1 | 9/2013 | Lillard, Jr. | |
| 2014/0263415 A1 | 9/2014 | Miguel et al. | |
| 2014/0312053 A1 | 10/2014 | Yamagami et al. | |
| 2015/0206373 A1 | 7/2015 | Kim et al. | |
| 2015/0245636 A1 | 9/2015 | Forrester, Jr. | |
| 2015/0264968 A1 | 9/2015 | Shuntich | |
| 2015/0322694 A1 | 11/2015 | Carr et al. | |
| 2017/0122645 A1 | 5/2017 | Berardino et al. | |
| 2017/0241693 A1 | 8/2017 | Tajika et al. | |
| 2017/0243430 A1 | 8/2017 | Davis | |
| 2017/0254584 A1 | 9/2017 | Denison et al. | |
| 2018/0045458 A1 | 2/2018 | Shuntich | |
| 2018/0120023 A1 | 5/2018 | Shuntich | |
| 2018/0135911 A1 | 5/2018 | Barnes | |
| 2018/0149422 A1 | 5/2018 | Spivey et al. | |
| 2018/0164033 A1 | 6/2018 | Lee | |
| 2018/0274842 A1 | 9/2018 | Yanagisawa et al. | |
| 2018/0310589 A1 | 11/2018 | Sosa | |
| 2018/0319581 A1 | 11/2018 | Heintz et al. | |
| 2019/0000108 A1 | 1/2019 | Shuntich | |
| 2019/0042015 A1 | 2/2019 | Lee et al. | |
| 2019/0256337 A1 | 8/2019 | Bhutani et al. | |
| 2020/0008448 A1 | 1/2020 | Sekita | |

FOREIGN PATENT DOCUMENTS

| | | |
|---|---|---|
| AU | 2011236097 A1 | 11/2011 |
| AU | 2014367824 B2 | 4/2018 |
| BR | PI0919723 A2 | 8/2015 |
| CA | 2332291 C | 4/2012 |
| CA | 2719220 C | 6/2016 |
| CN | 102506538 A | 6/2012 |
| CN | 103075867 B | 7/2015 |
| CN | 103403479 B | 11/2015 |
| CN | 103459950 B | 11/2015 |
| CN | 103575014 B | 10/2017 |
| EP | 1234798 A1 | 8/2002 |
| EP | 966220 B1 | 10/2003 |
| EP | 1821053 A1 | 8/2007 |
| EP | 1813894 A3 | 12/2009 |
| EP | 1808658 A3 | 12/2013 |
| EP | 1808659 A3 | 12/2013 |
| ES | 2517042 R1 | 11/2014 |
| GB | 2369611 A | 6/2002 |
| GB | 2448299 A | 10/2008 |
| GB | 2476834 A | 7/2011 |

(56) References Cited

FOREIGN PATENT DOCUMENTS

| | | | |
|---|---|---|---|
| GB | 2560792 | A | 9/2018 |
| IN | 201637041530 | A | 5/2017 |
| JP | 05006908 | B2 | 1/1993 |
| JP | 10340380 | A | 12/1998 |
| JP | 2001046029 | A | 2/2001 |
| JP | 2003214753 | A | 7/2003 |
| JP | 2005156042 | A | 6/2005 |
| JP | 2005318869 | A | 11/2005 |
| JP | 2008011835 | A | 1/2008 |
| JP | 2008145059 | A | 6/2008 |
| JP | 2008281227 | A | 11/2008 |
| JP | 2008292108 | A | 12/2008 |
| JP | 2009008331 | A | 1/2009 |
| JP | 2009019791 | A | 1/2009 |
| JP | 03154863 | U | 10/2009 |
| JP | 2016122388 | A | 7/2016 |
| JP | 2016202045 | A | 12/2016 |
| KR | 2008088944 | A | 10/2008 |
| KR | 2008088945 | A | 10/2008 |
| KR | 1176455 | B1 | 8/2012 |
| KR | 1205822 | B1 | 11/2012 |
| KR | 2013040711 | A | 4/2013 |
| KR | 2014147315 | A | 12/2014 |
| KR | 1502472 | B1 | 3/2015 |
| KR | 2015043103 | A | 4/2015 |
| KR | 2016012411 | A | 2/2016 |
| KR | 1674634 | B1 | 11/2016 |
| KR | 1933588 | B1 | 12/2018 |
| MX | 2006005367 | A | 3/2007 |
| WO | WO1999060091 | A1 | 11/1999 |
| WO | WO2005087015 | A1 | 9/2005 |
| WO | WO2006063401 | A1 | 6/2006 |
| WO | WO2009105737 | A2 | 8/2009 |
| WO | WO2010008611 | A2 | 1/2010 |
| WO | WO2017161254 | A1 | 9/2017 |
| WO | WO2018102611 | A1 | 6/2018 |
| WO | WO2018160594 | A1 | 9/2018 |
| WO | WO 2019/046174 | A1 | 3/2019 |

OTHER PUBLICATIONS

International Search Report and Written Opinion of the International Searching Authority in International Application No. PCT/US2019/054946, dated Dec. 13, 2019 (11 pages).
International Search Report and Written Opinion of the International Searching Authority in International Application No. PCT/US2020/025983, dated Jun. 30, 2020 (8 pages).
International Search Report and Written Opinion in International Application No. PCT/US2021/017435, dated Apr. 27, 2021 (11 pages).
Extended European Search Report in EP Application No. 20776947.2, dated Nov. 15, 2022; 8 pages.

* cited by examiner

BEVERAGE CONTAINER DISPENSER AND METHOD FOR DISPENSING BEVERAGE CONTAINERS

FIELD

Embodiments described herein generally relate to devices for dispensing beverage containers to consumers. Specifically, embodiments described herein relate to beverage container dispensers that display a simulation of a process of dispensing a beverage container.

BACKGROUND

Beverage dispensers for dispensing a packaged beverage to a consumer are well-known. Many such dispensers provide consumers with a selection of available beverages and allow the consumer to make a selection of a beverage. The device then dispenses a beverage container corresponding to the consumer's beverage selection. Many beverage dispensers are purely functional and simply dispense the selected beverage to the consumer. Such conventional beverage dispensers do not provide the consumer with a unique or entertaining experience, and the consumer must idly wait while the beverage is dispensed.

Therefore, a continuing need exists for a beverage container dispenser that provides a unique beverage dispensing experience for a consumer.

BRIEF SUMMARY OF THE INVENTION

Some embodiments relate to a method for dispensing a beverage container to a consumer, including receiving in a beverage container dispenser a first beverage container containing a beverage corresponding to a beverage selection of a user, and dispensing a second beverage container containing the beverage from a temperature-regulated compartment of the beverage container dispenser, wherein the second beverage container corresponds to the beverage selection of the user.

Some embodiments relate to a method for dispensing a beverage container that includes receiving a user selection of a beverage, displaying, upon receipt of the user selection, a simulation of a beverage container dispensing operation on a display, and dispensing, upon completion of the simulation, a beverage container corresponding to the user selection.

In any of the various embodiments discussed herein, receiving the first beverage container may include receiving the first beverage container in an inlet port of the beverage container dispenser. In some embodiments, the method for dispensing a beverage container further includes storing the first beverage container in the temperature-regulated compartment of the beverage container dispenser. In some embodiments, the method for dispensing a beverage container may further include storing the first beverage container in a storage compartment of the beverage container dispenser.

In any of the various embodiments discussed herein, receiving the first beverage container may include receiving a bottled or canned beverage.

In any of the various embodiments discussed herein, the method for dispensing a beverage container may further include detecting a type of beverage of the first beverage container by a detector of the beverage dispenser. In some embodiments, detecting the type of beverage of the first beverage container may include detecting indicia on the first beverage container by the detector, wherein the indicia corresponds to the type of beverage of the first beverage container. In some embodiments, the method may further include detecting indicia on the first beverage container to determine a beverage type, and dispensing the beverage container includes dispensing a second beverage container of the same beverage type as the first beverage container.

In any of the various embodiments discussed herein, the display is arranged on the beverage dispenser.

In any of the various embodiments discussed herein, receiving a user selection may include receiving the user selection by means of a user interface of a beverage container dispenser. In some embodiments, the user interface may be a touch-screen display.

In any of the various embodiments discussed herein, the simulation may depict a beverage container of the type selected by the user. In some embodiments, the simulation may depict a beverage container moving on the display towards a delivery portal of the beverage dispenser. In some embodiments, the simulation may be a pre-recorded video.

In any of the various embodiments discussed herein, dispensing the beverage container may include dispensing the beverage container from a temperature-regulated compartment of a beverage container dispenser.

Some embodiments relate to a beverage container dispenser that includes a housing, a user interface for receiving a user selection of a beverage, a first temperature-regulated compartment arranged within the housing for storing a first beverage container containing a beverage at a first predetermined temperature, a second temperature-regulated compartment arranged within the housing for storing a second beverage container containing the beverage at a second predetermined temperature, and a delivery portal arranged on the housing for providing access to a beverage container corresponding to the user selection.

In any of the various embodiments discussed herein, the first temperature may be greater than the second temperature, and the second temperature may be at or below a freezing point of the beverage of the second beverage container. In some embodiments, the first temperature may be about 35° F. to about 45° F.

In any of the various embodiments discussed herein, the first beverage container and the second beverage container may each store the same type of beverage.

In any of the various embodiments discussed herein, the beverage container dispenser may further include a display that displays a simulation of a beverage container dispensing operation upon receipt of the user selection.

In any of the various embodiments discussed herein, the beverage container dispenser may further include a beverage collector configured to retrieve the first beverage container or the second beverage container based on the user selection and transport the first or second beverage container to the delivery portal.

In any of the various embodiments discussed herein, the beverage container dispenser may further include an agitator configured to receive the second beverage container dispensed from the second temperature-regulated compartment, and the agitator may cause the beverage within the second beverage container to undergo nucleation so as to create a slush beverage with the second beverage container.

Some embodiments relate to a method for providing a slush beverage in a beverage container that includes receiving a user selection of a beverage by a beverage container dispenser, displaying, on a display of the beverage dispenser, a simulation of a beverage container being dispensed, dispensing a beverage container corresponding to the user selection from a first temperature-regulated compartment having a first predetermined temperature at or below a freezing point of the beverage, and displaying an instruction for causing nucleation of the beverage within the beverage container.

In any of the various embodiments discussed herein, displaying an instruction for causing nucleation may include displaying a video demonstrating a process for causing nucleation. In some embodiments, displaying an instruction for causing nucleation may include displaying an instruction to shake the beverage container. In some embodiments, a beverage container dispenser may further include an agitator configured to cause nucleation of the beverage within the beverage container, and displaying the instruction may include an instruction to operate the agitator.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
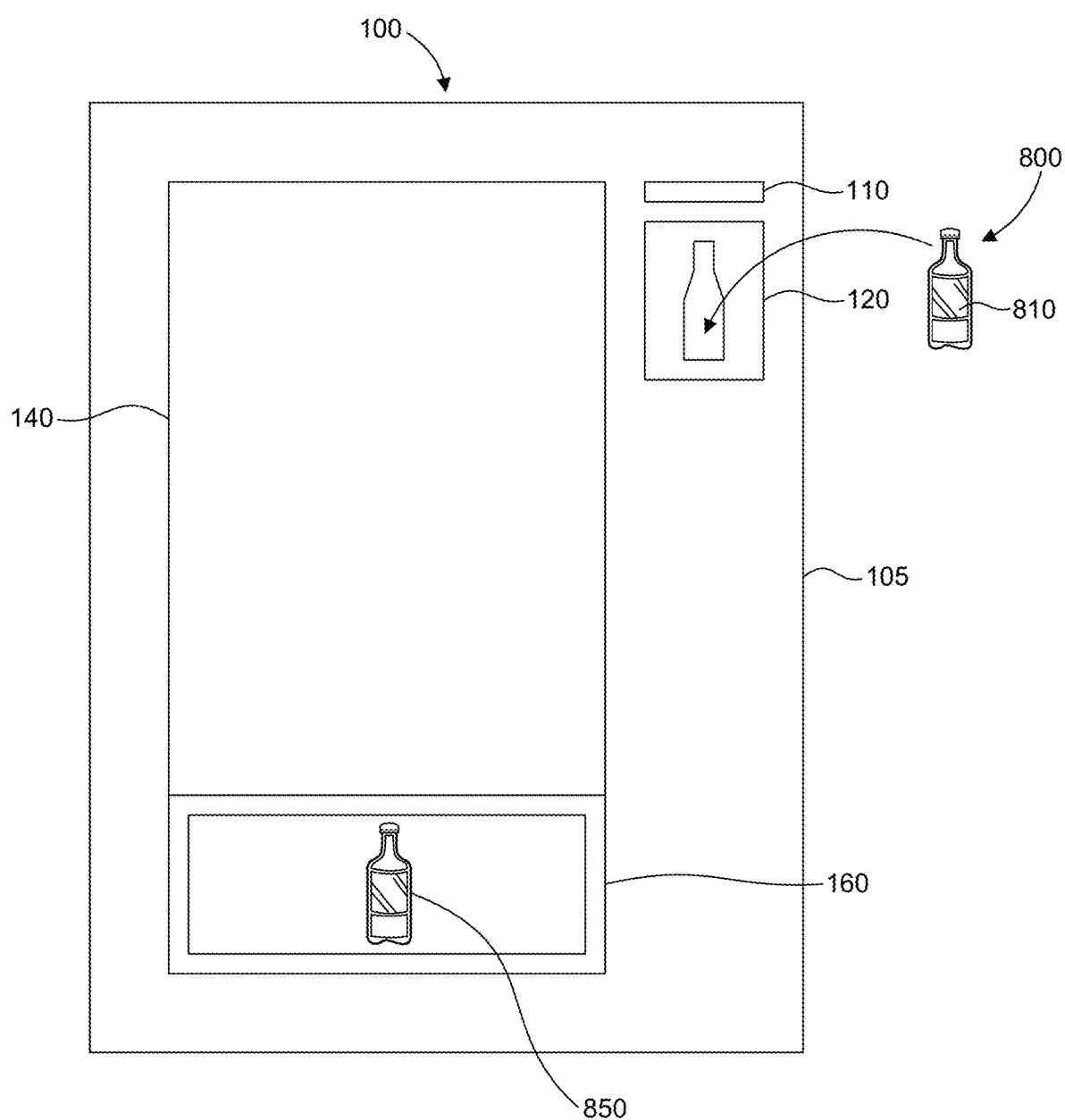
FIG. 1 shows a beverage container dispenser according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Vending machines for dispensing packaged beverages, such as bottled or canned beverages, whether in plastic or glass bottles are well-known. Vending machines allow consumers to quickly and easily purchase a beverage in an on-demand basis. As a result, the consumer does not have to enter a store, search for a desired beverage, wait in a line to checkout, and pay for the beverage at a checkout counter or the like.

While vending machines provide convenience for the consumer, conventional vending machines may have a number of drawbacks. In particular, many vending machines simply receive a consumer selection of a beverage and dispense the selected beverage to the consumer. The consumer must wait idly for a period of time while the beverage is dispensed. Such vending machines do not provide a unique or entertaining experience for the consumer that would entice the consumer to return to that vending machine to make additional purchases. As a result, a consumer may choose to make future beverage purchases from other vendors or vending machines. Instead, the consumer may wish to view a process by which the beverage is dispensed in order to have a unique experience. Additionally, if the consumer could watch the process of the beverage being prepared, the consumer may have a unique and entertaining experience. By providing a unique consumer experience, a beverage dispenser and vending machine owner may increase overall sales.

Further, vending machines generally dispense only a cooled or chilled beverage container from a refrigerated compartment within the vending machine. Such vending machines do not allow consumers to choose a temperature of the dispensed beverage container. Consumers may prefer to have the option to select a temperature of the dispensed beverage so as to select, for example, a cooled beverage or a slush beverage. The availability of multiple temperature options, including an option to select a slush beverage in a beverage container may entice a consumer to revisit a particular vending machine.

Other types of beverage dispensers known in the art have similar limitations in that such beverage dispensers simply dispense a beverage to the consumer. Thus, such beverage dispensers do not provide a unique or entertaining experience. The process of dispensing the beverage is not depicted to the consumer and the consumer must simply wait while the beverage is dispensed. Further, generally beverage dispensers do not provide consumers with the option to select a temperature of a beverage, such as to select a chilled beverage or a slush beverage.

While some devices are known for providing slush beverages to consumers, known systems for providing slush beverages have numerous drawbacks. Such systems may require that the consumer to manually remove a beverage container from a refrigerator, shake or open and re-cap the beverage container, and position the beverage container in a nucleation device for nucleating the beverage to create a slush beverage within the beverage container. However, opening the refrigerator to withdraw a beverage container may cause the temperature within the refrigerator to vary. If the beverage containers are not stored at the proper temperature, the beverage will not nucleate and a slush beverage will not be produced. Further, the consumer may be required to follow a series of instructions and perform a variety of tasks to create the slush beverage. This introduces several opportunities for user error, and if the consumer is unable to produce a slush beverage, the consumer will be unlikely to use the device again or make additional purchases. Further, many consumers may find it inconvenient to follow a series of steps to prepare a slush beverage, and consumers may opt to not use the slush beverage system in favor of more straightforward and less time-consuming beverage purchasing options.

In some embodiments described herein, a beverage container dispenser includes an inlet port for receiving a first beverage container and dispenses a second beverage container from a temperature-controlled compartment to give the consumer the impression that the beverage container inserted is the cooled beverage container being dispensed. In some embodiments described herein, a beverage container dispenser includes a display for displaying a simulation of a beverage dispensing operation so as to provide consumers with a unique and entertaining experience. In some embodiments described herein, a beverage container dispenser includes a first temperature-regulated compartment and a second temperature-regulated compartment such that a consumer may select the temperature of the beverage to be dispensed, and wherein one temperature is at or below a freezing point of the beverage so as to provide a slush beverage to the consumer.

These and other embodiments are discussed with reference to the figures, which are incorporated by reference thereto in their entirety. However, those skilled in the art will readily appreciate that the detailed description given herein with respect to these figures is for explanatory purposes only and should not be construed as limiting.

In any of the various embodiments described herein, the term "beverage container" may refer to any of various types of containers for storing a beverage. The beverage container may be in the form of a bottle or a can. The beverage container may comprise any of various materials, including glass, metal, such as aluminum, or plastic, such as polyethylene terephthalate (PET), among others.

As used herein, the term "beverage" includes any consumable free-flowing liquid or semi-liquid product, which may be carbonated or non-carbonated, including but not limited to soft drinks, water, carbonated water, dairy beverages, juices, alcoholic beverages, sports drinks, smoothies, coffee beverages, tea beverages, and milkshakes, among others. Further, the term, "slush beverage" includes any beverage as described herein that is at least partially frozen, such that the beverage is part liquid and part solid.

In some embodiments, a beverage container dispenser 100 includes an inlet port 120 for receiving a first beverage container 800. First beverage container 800 may be at an ambient temperature and may be a full and unopened beverage container that is ready to be purchased by a consumer. A first temperature-regulated compartment 180 (see FIG. 2) stores a second beverage container 850 at a predetermined temperature such that second beverage container 850 is cooled. Upon receipt of first beverage container 800 by inlet port 120, second beverage container 850 is dispensed to a delivery portal 160 of beverage container dispenser 100. Second beverage container 850 contains the same type of beverage as the beverage in first beverage container 800. Thus, beverage container dispenser 100 provides a consumer with an impression that first beverage container 800 inserted into inlet port 120 is the same as the cooled second beverage container 850 that is dispensed.

Beverage container dispenser 100, as shown in FIG. 1, may include a housing 105 such that beverage container dispenser 100 is a stand-alone device. Beverage container dispenser 100 may be installed on a support surface, such as a floor, and can be used in any of various environments, such as in a restaurant, an office, a school, a movie theater, a convenience store, a sporting stadium, or a concert venue, among others.

An inlet port 120 may be arranged on housing 105 of beverage container dispenser 100, such as on a sidewall of housing 105. Inlet port 120 may be sized so as to receive a first beverage container 800 containing a beverage, such as a canned beverage or a bottled beverage. Inlet port 120 is configured to receive a first beverage container 800 that is the same as a second beverage container 850 stored within beverage container dispenser 100. In some embodiments, inlet port 120 may be sized and/or shaped to receive the appropriate beverage container. For example, if beverage container dispenser 100 stores only bottles of beverage A and beverage B, inlet port 120 is configured to receive only bottles of beverage A or beverage B. Inlet port 120 may be shaped similarly to a beverage container to be inserted into inlet port 120. Thus, inlet port 120 may include a bottle-shaped opening or a can-shaped opening, for receiving a bottle or a can in a substantially upright orientation, for example. In some embodiments, inlet port 120 may have a rectangular or oval-shaped opening that is sized so as to be capable of receiving a beverage container.

A delivery portal 160 may also be arranged on housing 105 of beverage container dispenser 100 for providing a consumer with access to a dispensed beverage container. Delivery portal 160 can be located in any of various positions on housing 105 and may be positioned, for example, on a sidewall of housing 105. In some embodiments, delivery portal 160 may include a door or lid for removably covering delivery portal 160 until a beverage container is dispensed. Housing 105 may define a rectangular delivery portal 160 as shown in FIG. 1, however, in alternate embodiments, delivery portal 160 may be formed so as to have any of various shapes, including but not limited to square, oval, bottle-shaped, can-shaped or other suitable shapes.

Figure 2:
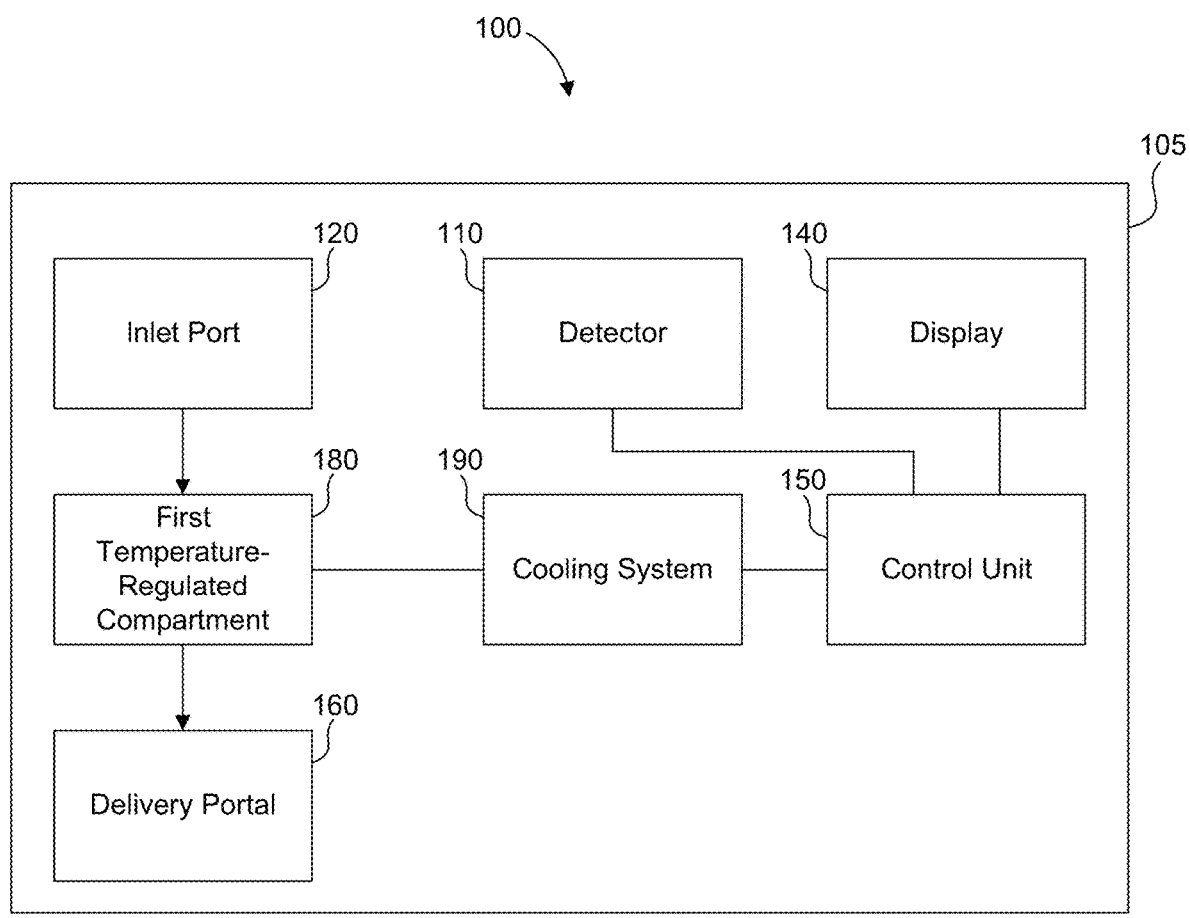
FIG. 2 shows a schematic diagram of components of a beverage container dispenser according to an embodiment.

Beverage container dispenser 100 further includes a first temperature-regulated compartment 180, as shown in FIG. 2, for storing a second beverage container 850 at a first predetermined temperature. First temperature-regulated compartment 180 is arranged within housing 105. First temperature-regulated compartment 180 may store a plurality of beverage containers so that they are not accessible by consumers. First temperature-regulated compartment 180 may be insulated so as to maintain the first predetermined temperature and limit or reduce heat transfer into first temperature-regulated compartment 180. For example, first temperature-regulated compartment may be composed of one or more layers of a thermally insulating material and/or may have a double-walled construction. The first predetermined temperature may be a temperature of about 35° F. to about 55° F., or about 35° F. to about 50° F. In this way, beverage container dispenser 100 may dispense a second beverage container from first temperature-regulated compartment 180 that is cooled or chilled.

Figure 3:
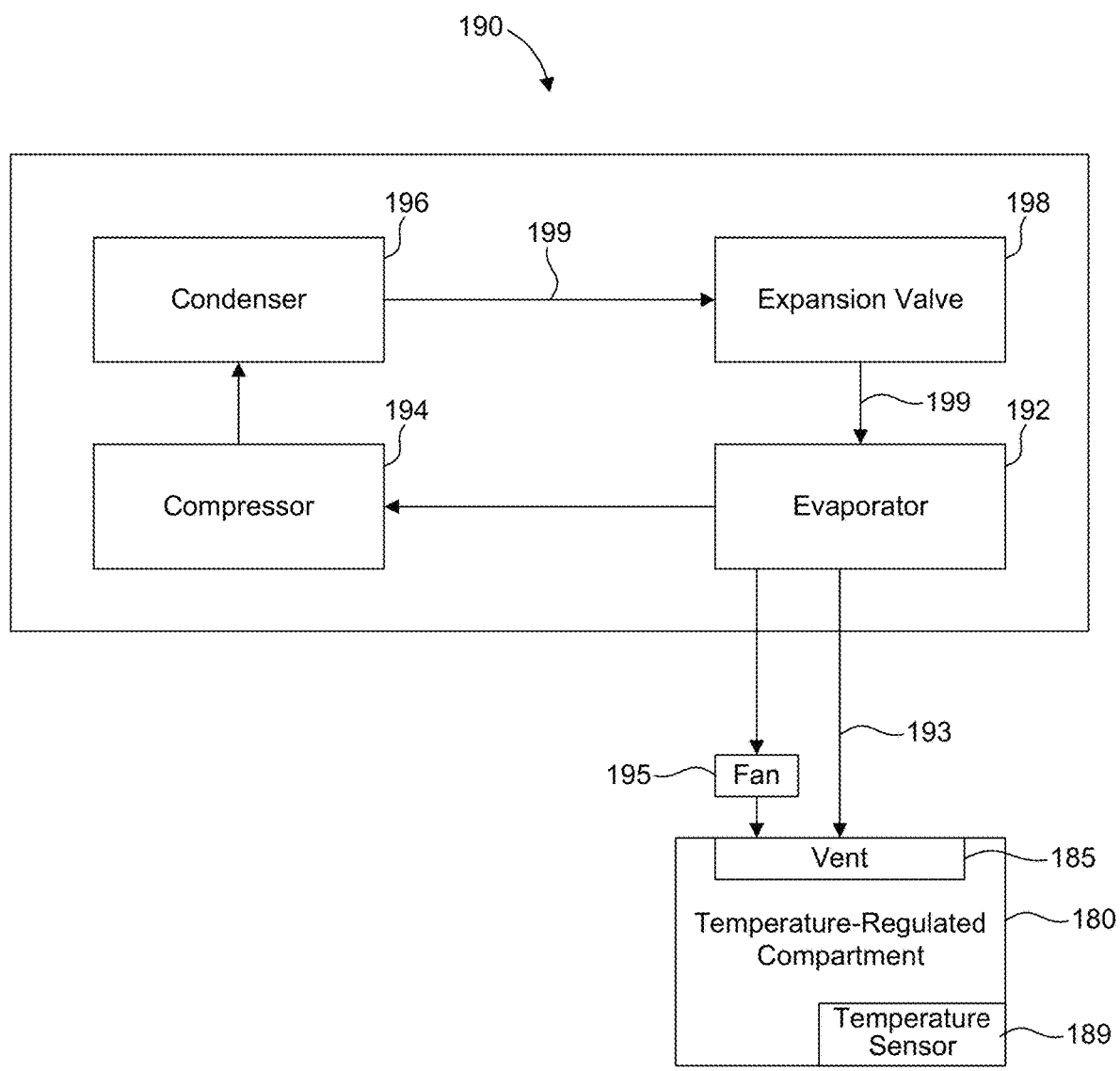
FIG. 3 shows a cooling system of a beverage container dispenser according to an embodiment.

Beverage container dispenser 100 may include a cooling system 190, as shown for example at FIG. 3. Cooling system 190 is configured to maintain first temperature-regulated compartment 180 at the first predetermined temperature. In an embodiment, cooling system 190 may include an evaporator 192 that is in communication with a compressor 194, a condenser 196, and an expansion valve 198 via a plurality of conduits 199 for circulating a refrigerant. Evaporator 192 supplies cooled air through ducts 193 to first temperature-regulated compartment 180. First temperature-regulated compartment 180 may have vents 185 through which cooled air can flow from evaporator 192 through ducts 193 and into first temperature-regulated compartment 180. Ducts 193 may further be connected to fans 195 for promoting circulation of cooled air within first temperature-regulated compartment 180. In some embodiments, first temperature-regulated compartment 180 may include one or more temperature sensors 189 to determine a temperature within compartment 180. A control unit 150 may automatically adjust operation of cooling system 190 to maintain the temperature of first temperature-regulated compartment 180 at the first predetermined temperature based on the reading of temperature sensor(s) 189. In alternate embodiments, other types of cooling systems may be used so long as the temperature of first temperature-regulated compartment 180 is maintained at the first predetermined temperature.

Figure 4:
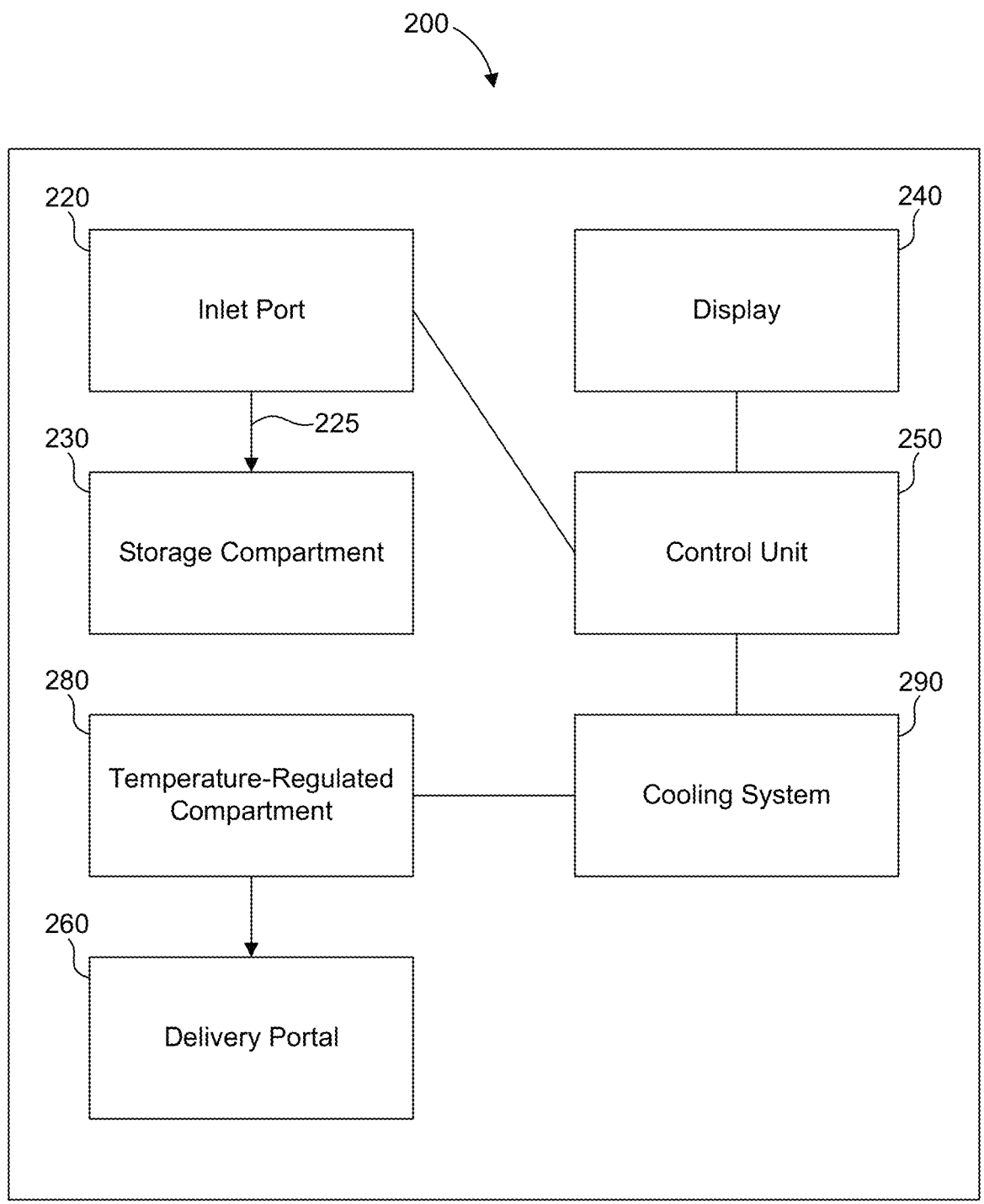
FIG. 4 shows a schematic diagram of components of a beverage container dispenser according to an embodiment.

In some embodiments, a beverage container dispenser 200 includes an inlet port 220 that directs a beverage container inserted into inlet port 220 to a storage compartment 230 of beverage dispenser 200, as shown in FIG. 4. Inlet port 220 may be in communication with storage compartment 230, such as by a chute or passageway 225. Storage compartment 230 is located within beverage dispenser 200 (e.g., is disposed entirely within housing 105) so that storage compartment 230 and any beverage containers therein are not accessible by consumers. Storage compartment 230 may collect and store beverage containers received by inlet port 220. Thus, beverage containers within storage compartment 230 are not dispensed. In some embodiments, storage compartment 230 may be manually emptied by an operator of beverage dispenser 200. By directing beverage containers to storage compartment 230, an operator can inspect any beverage containers therein to ensure that the beverage containers inserted into inlet port 220 by consumers have not been damaged, opened, or otherwise tampered with prior to restocking the inserted beverage containers for purchase by other consumers. Further, storage compartment 230 can collect any non-beverage container items that are mistakenly or intentionally inserted into inlet port 220.

In some embodiments, as shown in FIG. 2, first beverage containers 800 received by inlet port 120 of beverage container dispenser 100 are directed to a temperature-regulated compartment 180. In such embodiments, temperature-regulated compartment 180 is continuously, or periodically refilled with beverage containers during normal operation, as a beverage container inserted into inlet port 120 by a consumer replaces a beverage container dispensed to the consumer from first temperature-regulated compartment 180 so that the number of beverage containers within beverage container dispenser 100 remains constant. As a result, in some embodiments operators do not have to restock or refill beverage container dispenser 100 with beverage containers, as beverage container dispenser 100 is refilled by consumers during normal operation.

In some embodiments, first temperature-regulated compartment 180 defines a passageway that guides beverage containers from an inlet toward an outlet of first temperature-regulated compartment 180. Beverage containers are arranged within first temperature-regulated compartment 180 in a sequential manner such that a first beverage container inserted is the first to be dispensed. In this way, a beverage container inserted through inlet port 120 by a consumer will remain in temperature-regulated compartment 180 for a sufficient time to allow the beverage container to be cooled to the predetermined temperature, as an inserted beverage container will not be dispensed until all previously inserted beverage containers held within first temperature-regulated compartment 180 are dispensed. In some embodiments, however, first beverage container 800 inserted into inlet port 120 by a consumer may pass through temperature-regulated compartment 180 so as to be rapidly cooled and is then dispensed to delivery portal 160 such that first beverage container 800 inserted by the consumer is the same as second beverage container 850 dispensed to the consumer.

Inlet of first temperature-regulated compartment 180 is in communication with inlet port 120 of beverage container dispenser 100 so that a beverage container inserted into inlet port 120 passes through inlet of temperature-regulated compartment 180 and into compartment 180. At an outlet of first temperature-regulated compartment 180, a beverage container can be transferred to delivery portal 160 of beverage container dispenser 100 for access by a consumer. In some embodiments, a beverage container may be moved from outlet of first temperature-regulated compartment 180 by a delivery mechanism for retrieving and transporting the beverage container. In some embodiments, a beverage container at the outlet of first temperature-regulated compartment 180 may move directly to delivery portal 160 without the use of a delivery mechanism, such as by dropping the beverage container along a chute under the force of gravity. A beverage dispenser having a chute for dispensing a beverage container under the force of gravity as is disclosed for example in Indian patent application no. 201841038006, incorporated herein by reference in its entirety.

In embodiments in which beverage container dispenser 100 includes multiple temperature-regulated compartments 180, first beverage container 800 inserted into inlet port 120 by a consumer is directed to a temperature-regulated compartment 180 for storing the type of beverage within first beverage container 800. As shown, for example, in FIGS. 1-2, beverage container dispenser 100 may include a detector 110 for determining the type of beverage held within first beverage container 800, such that beverage container dispenser 100 may direct first beverage container 800 to a temperature-regulated compartment 180 for storing the type of beverage held within first beverage container 800. For example, if first beverage container 800 stores beverage A, and beverage container dispenser 100 includes a first temperature-regulated compartment 180 for storing beverage A and a second temperature-regulated compartment for storing beverage B, detector 110 may detect that first beverage container 800 stores beverage A and thus first beverage container 800 is directed to first temperature-regulated compartment 180.

In some embodiments, detector 110 may be a scanner capable of reading a barcode, QR code, or other indicia 810 on first beverage container 800 (see FIG. 1) in order to determine the type of beverage of first beverage container 800. Detector 110 may comprise an optical scanner, an RFID reader, or other suitable device. Detector 110 may be positioned adjacent inlet port 120 and is configured to detect first beverage container 800 when received by inlet port 120, or in some embodiments, a consumer may be required to scan first beverage container 800 prior to inserting first beverage container 800 into inlet port 120. Inlet port 120 may be configured to only receive a beverage container after the beverage container is scanned by detector 110.

Detector 110 may be operably connected to a control unit 150, as shown in FIG. 2. Control unit 150 may include a database of available beverage containers within beverage container dispenser 100. Upon scanning first beverage container 800 by detector 110, control unit 150 may determine the type of beverage of first beverage container 800 and compare the type of beverage to the database of available beverages. If the type of beverage of first beverage container 800 as detected by detector 110 is available in beverage container dispenser 100 as determined by control unit 150, control unit 150 will allow receipt of first beverage container 800 by inlet port 120. Otherwise, inlet port 120 will not allow receipt of first beverage container 800, and a display 140 may provide a notice or instruction to the consumer that the selected beverage is unavailable and/or an instruction to select a different beverage. In this way, beverage container dispenser 100 prevents a consumer from inserting beverage containers that are not available to be dispensed, and helps to ensure that a consumer receives the desired beverage.

In such embodiments, upon receiving a first beverage container 800, beverage container dispenser 100 dispenses a second beverage container 850 corresponding to the type of beverage stored by first beverage container 800 as determined by the detector 110. As a result, the consumer is provided with the impression that second beverage container 850 that is dispensed is the same as first beverage container 800 inserted into inlet port 120.

Figure 5:
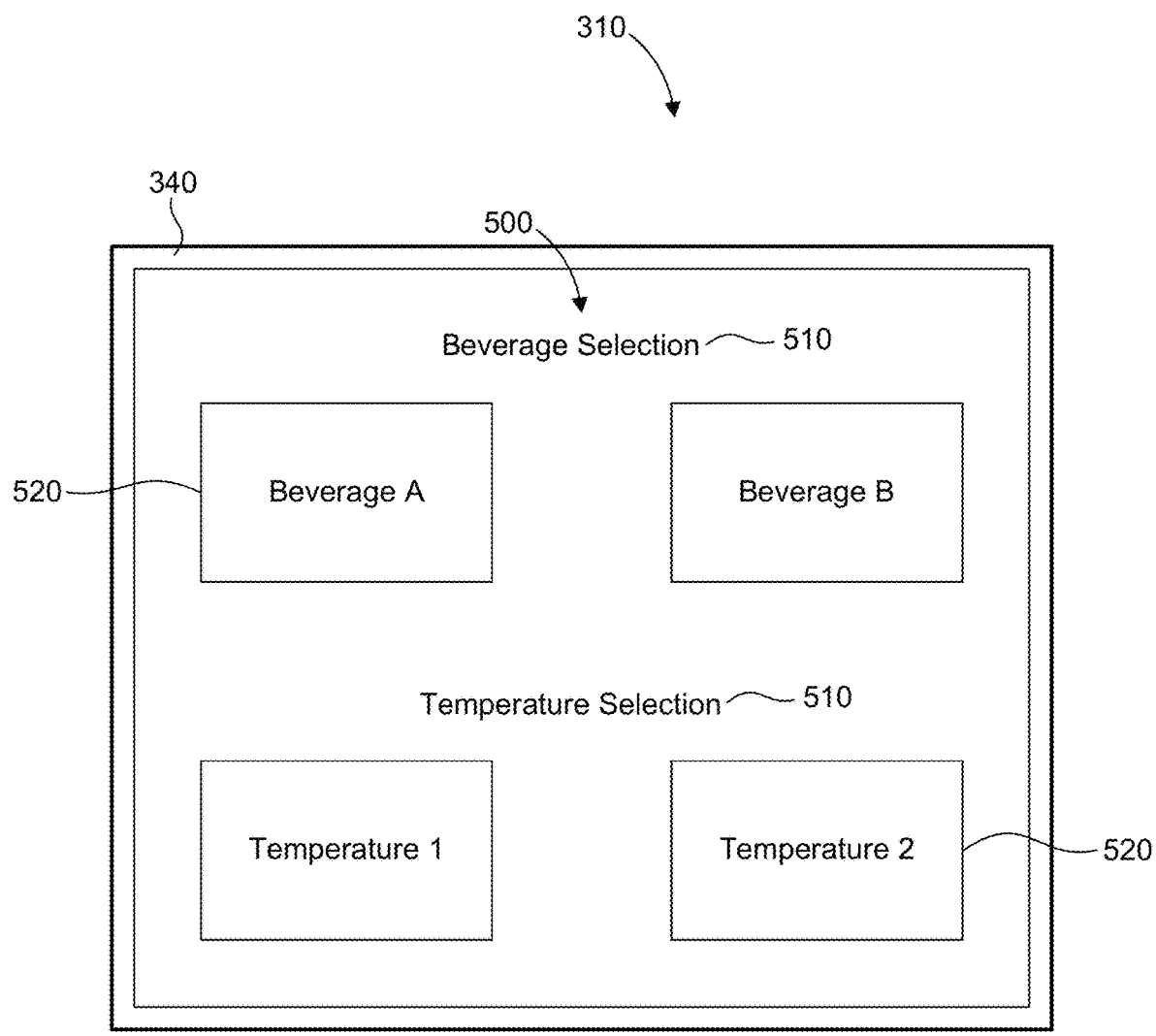
FIG. 5 shows a graphical user interface for a beverage container dispenser according to an embodiment.

In some embodiments, a beverage container dispenser 300 may include a user interface 310 for receiving a user selection of a beverage, as shown for example at FIG. 5. User interface 310 may include a plurality of push-buttons, levers, handles, or actuators. User interface 310 may further include an electronic display screen, such as a liquid crystal display (LCD), a light emitting diode (LED) display, or an organic LED (OLED) display. In some embodiments, user interface 310 may be a touch-screen display 340. Touch-screen display 340 may display a graphical user interface 500 on which icons corresponding to available beverages are displayed and which may display instructions for operating a beverage container dispenser.

Graphical user interface 500 may display instructions 510 for the consumer to make a beverage selection and dispense a beverage container. In some embodiments, graphical user interface 500 may display instructions 510 for the consumer to make a temperature selection for the beverage to be dispensed, such that user may select a chilled beverage or a slush beverage. Graphical user interface 500 may further display icons 520 indicating types of beverages available (e.g., Beverage A, Beverage B) and indicating the temperature selection (e.g., Temperature 1 (chilled beverage), Temperature 2 (slush beverage)). Consumers may make selections by touching the portion of the touch-screen display 340 at which a particular icon 520 is displayed.

In some embodiments, beverage container dispenser 300 may be configured to receive a user input of a beverage selection by means of a mobile device 700, such as a smartphone, tablet or other portable electronic device of the consumer. Mobile device 700 may include a software application (e.g., an "app") configured to display instructions for dispensing a beverage and/or display the types of beverages available and the beverage temperature options. Beverage container dispenser 300 may include a communication assembly 330 (see FIG. 7) configured to communicate with mobile device 700 via wireless communication methods, such as by Bluetooth or other short distance wireless networking, or by wireless local area networking, e.g., Wi-Fi, among others, so as to receive the consumer's selections.

In some embodiments, a beverage container dispenser 100 may include a display 140, as shown for example at FIG. 1. In embodiments of beverage container dispenser 100 having a touch-screen display as the user interface, the touch-screen display may serve as both user interface and display 140. In embodiments in which user interface is a plurality of buttons, levers, actuators, or controls, display 140 may be separate from the user interface.

Display 140 of beverage container dispenser 100 may be configured to display a simulation 600 of a process of dispensing a beverage, such as, for example, a beverage container. In some embodiments, simulation 600 may alternatively or additionally be displayed on a display of a mobile device 700, such as a smartphone, tablet or other portable electronic device of the consumer.

Simulation 600 may include a depiction of a beverage container. The beverage container shown in the simulation may be shown on display 140 in the same dimensions as the actual beverage container. The beverage container shown in simulation 600 may also be the same type and style of beverage container selected by the consumer. In this way, simulation 600 may provide a consumer with the impression that a beverage container shown in simulation 600 is the same as the beverage container that is dispensed to the consumer by beverage container dispenser 100. In embodiments in which a consumer inserts a first beverage container into inlet port 120, simulation 600 may also provide the impression that the first beverage container inserted in inlet port 120 is the beverage container that is shown in simulation 600 and that is dispensed upon completion of simulation 600. Thus, simulation 600 may begin with a beverage container appearing on a portion of display 140 that is adjacent inlet port 120 to provide the appearance that the inserted beverage container is shown on display 140. Further, as the beverage container completes simulation 600, the beverage container shown in the simulation 600 may move to a portion of display 140 located near delivery portal 160 to provide the impression that the beverage container of simulation 600 is dispensed to delivery portal 160. Thus, beverage container dispenser 100 provides the consumer with a unique experience in which the consumer can view a simulation 600 of the beverage container being dispensed.

In an embodiment, simulation 600 may be stored as a digital video file, such as in a memory of control unit 150, and dispenser 100 may be configured to play the digital video file on display 140. The video may automatically be played upon receipt of a user selection, whether from a user interface or by receipt of a first beverage container via an inlet port 120. Control unit 150 may play a digital video file on display 140 upon receipt of the user selection. Simulation 600 may be based upon the type or style of beverage selected, such that each type of beverage has a separate simulation. Further, beverage dispenser 100 may include multiple digital video files of different simulations such that each beverage purchased by a consumer may result in display of a different simulation.

Simulation 600 may depict a beverage container dispensing operation. Simulation 600 may include live footage, computer animation, computer-generated images, or a combination thereof. The term "beverage container dispensing operation" refers to any process in which a beverage or beverage container is dispensed, such as a beverage container moving from a storage area shown on the display towards a delivery portal, such as along a track or pathway. In some embodiments, simulation 600 may depict the operation of a Rube Goldberg-type machine for dispensing a beverage container such that a chain of events results in a beverage container being dispensed. Beverage container dispensing operation may also include a process for preparing a beverage, such as a process of cooling or chilling the beverage or a process of forming a slush beverage. Thus, simulation 600 may show a beverage container being sprayed by cooled air or submerged in an ice bath to suggest to a consumer that the beverage container is being cooled. In embodiments showing formation of a slush beverage, simulation 600 may depict the beverage container being agitated so as to cause nucleation of the beverage within the beverage container. Simulation 600 may depict agitation by showing a beverage container being subjected to a mechanical impact or jerk. For example, simulation 600 may show beverage container falling onto a surface, being struck by an object, or being shaken, among other methods for agitating a beverage. Once agitated, simulation 600 may depict the beverage within the container gradually freezing, such as by showing ice or ice crystals forming within beverage.

Figure 6:
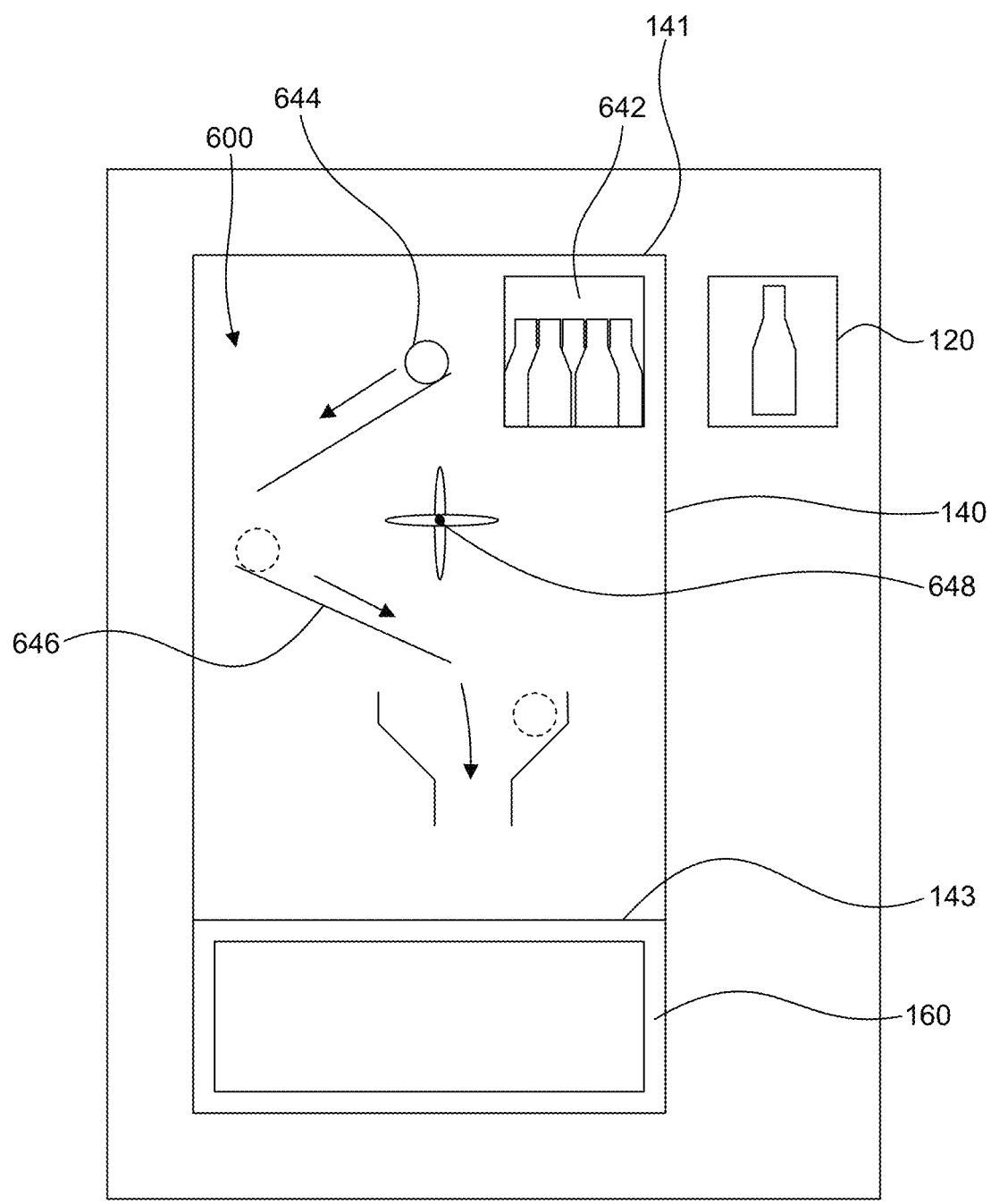
FIG. 6 shows a display of a simulation of a beverage dispensing operation according to an embodiment.

For example, in one embodiment as shown in FIG. 6, simulation 600 may be an animation showing a beverage container 644 of the type selected by the consumer moving from a storage area shown on display 140 to a dispensing area. Simulation 600 may depict a beverage container 644 being selected from a number of beverage containers in a beverage storage area 642. The selected beverage container 644 then moves or rolls along a pathway 646 from an upper portion 141 of display 140 adjacent inlet port 120 to a lower portion 143 of display 140 adjacent delivery portal 160 of beverage container dispenser 100. Along pathway 646, beverage container 644 may encounter one or more obstacles 648, and may undergo one or more treatments, such as cooling. Simulation 600 may further include various visual effects and embellishments as beverage container 644 moves towards delivery portal 160. Simulation 600 may further include audio, such as sound effects to be played by a speaker of beverage container dispenser 100 to provide additional interest and entertainment.

Upon completion of simulation 600, beverage container dispenser 100 is configured to dispense a second beverage container from temperature-regulated compartment 180 in order to provide the impression that the beverage container shown in simulation 600 is being dispensed to the consumer. The dispensing operation may be timed with the completion of the simulation such that the simulation ends and the second beverage container is dispensed at substantially the same time. Thus, for example, simulation 600 may have a set runtime and a control unit 150 of beverage container dispenser 100 may play simulation 600 on display 140 and dispense a beverage container after the runtime of simulation 600 has elapsed.

In some embodiments, display 140 may further be configured to display an image or video when beverage container dispenser 100 is in an idle state. Thus, when beverage container dispenser 100 is not being used by a consumer, display 140 may be configured to display images or videos designed to attract the attention of consumers. In the idle state, display 140 may show advertisements and/or images or videos of beverages available for purchase. Display 140 may automatically enter an idle state if beverage container dispenser 100 is not engaged by a consumer for a fixed period of time. When a consumer engages beverage container dispenser 100, beverage container dispenser 100 may return to displaying a graphical user interface for receiving a consumer selection of a beverage and/or a beverage temperature. A consumer may be detected by a sensor of the beverage container dispenser 100, such as a motion sensor, a proximity sensor, or a thermal sensor, or a consumer may be detected by consumer interaction with the user interface, such as by touching a touch screen display. Upon completion of a beverage dispensing operation, which may include displaying a simulation, display may return to an idle state.

Figure 7:
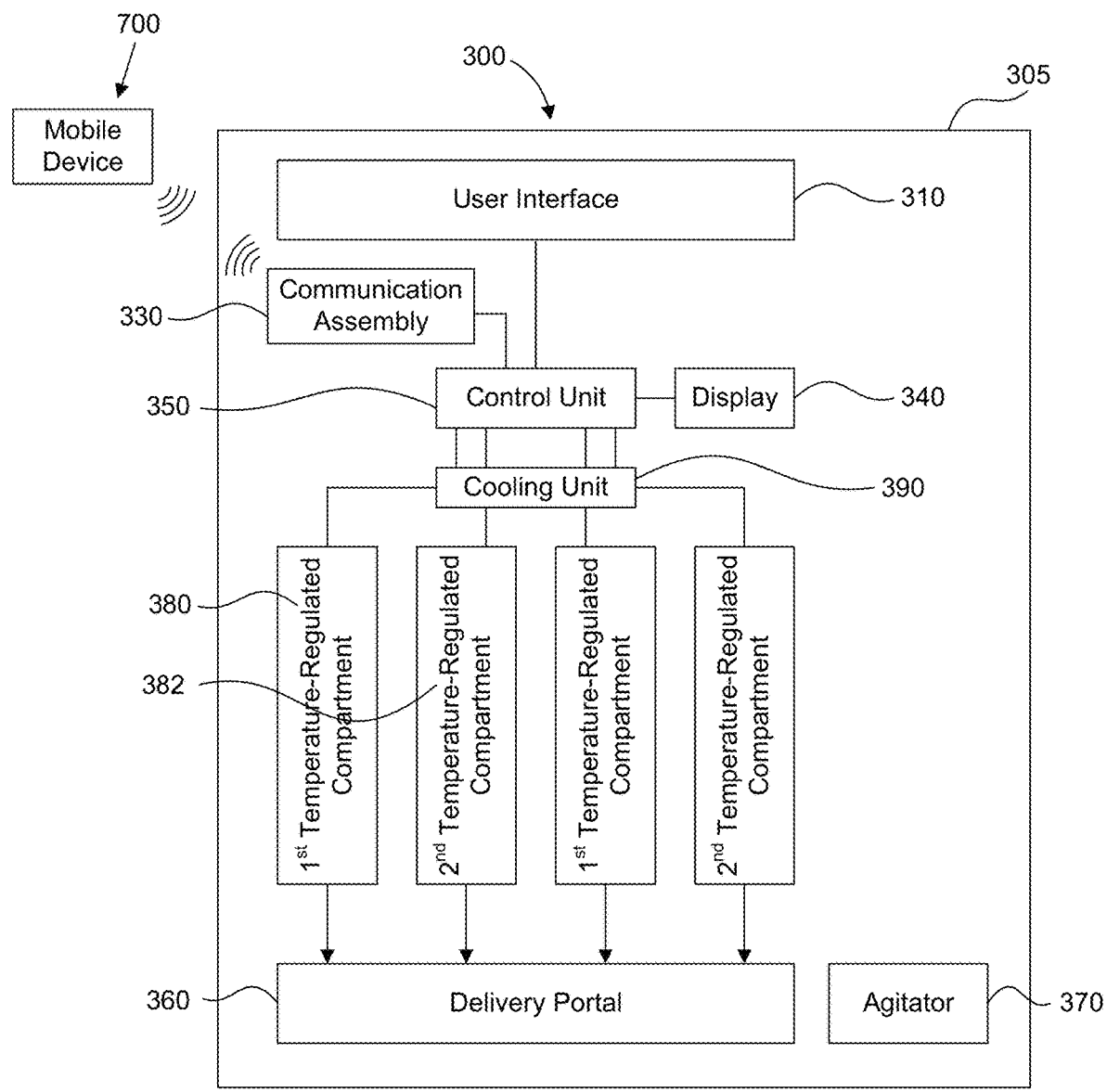
FIG. 7 shows a schematic diagram of components of a beverage container dispenser for storing beverage containers at different temperatures according to an embodiment.

Some embodiments described herein relate to a beverage container dispenser 300 that may include a first temperature-regulated compartment 380 for storing beverage containers at a first predetermined temperature, and a second temperature-regulated compartment 382 for storing beverage containers at a second predetermined temperature, as shown for example at FIG. 7. First and second temperature-regulated compartments 380, 382 are operably connected to a cooling system 390 for maintaining the temperature-regulated compartments 380, 382 at the first and second predetermined temperatures, respectively.

Figure 13:
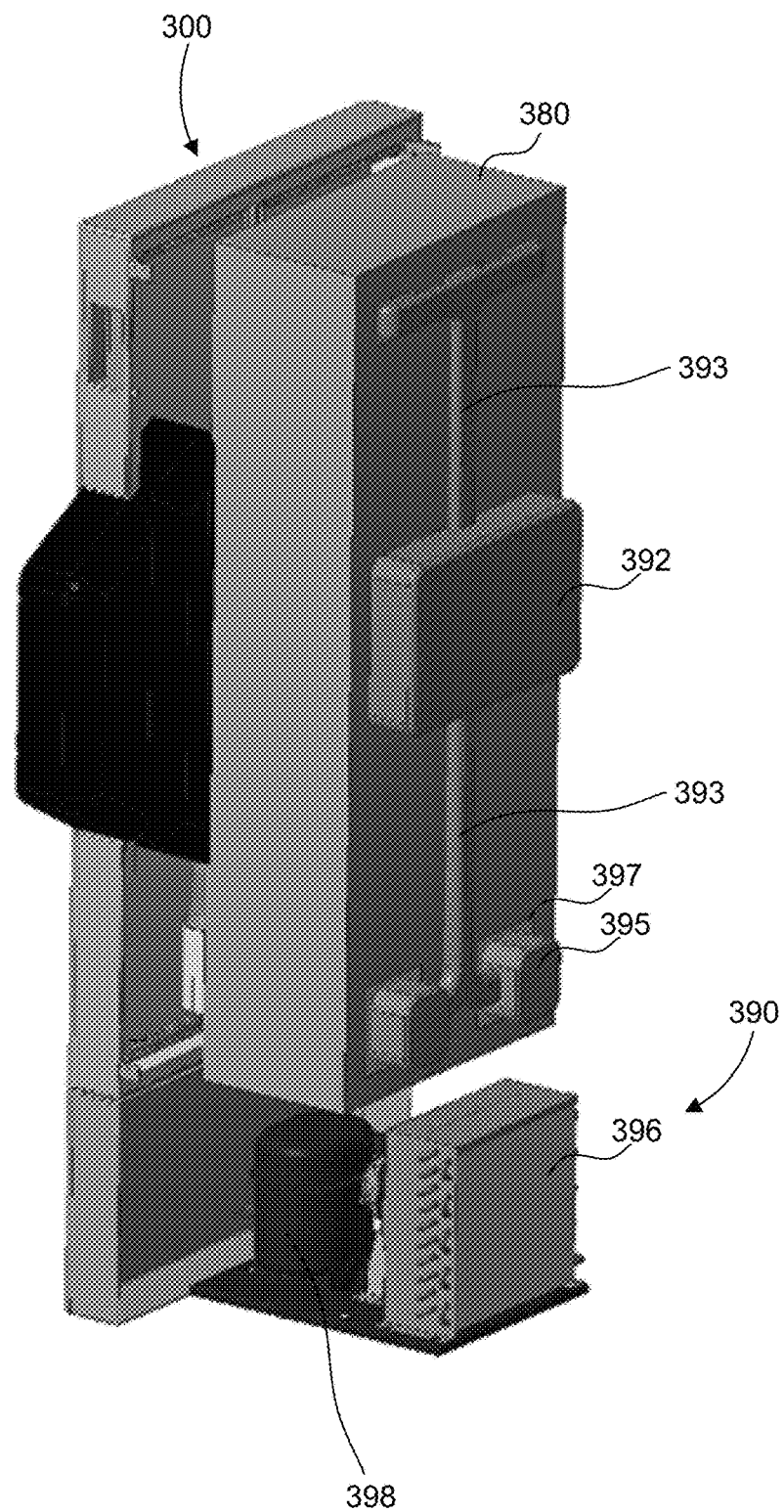
FIG. 13 shows a perspective view of components of a cooling system of the beverage container dispenser according to FIG. 8.

A single cooling system 390 may be used for each of the temperature-regulated compartments 380, 382 or multiple cooling systems may be used. Cooling system 390 may be configured in the same manner as cooling system 190 described above with respect to beverage container dispenser 100. Thus, cooling system 390 may include an evaporator 392 that is in communication with a compressor 398, a condenser 396, and an expansion valve via a plurality of conduits for circulating a refrigerant, as shown in FIG. 13. Evaporator 392 supplies cooled air through ducts 393 to temperature-regulated compartment 380. Temperature-regulated compartment 380 may have vents 397 through which cooled air can flow from evaporator 392 through ducts 393 and into first and second temperature-regulated compartments 380, 382 and may have fans 395 for promoting circulation of cooled air within temperature-regulated compartment 380.

In some embodiments, first temperature-regulated compartment 380 and second temperature-regulated compartment 382 of beverage container dispenser 300 are configured to store the same type of beverage. Thus, beverage container dispenser 300 is capable of dispensing a beverage at a first or second predetermined temperature as desired by the consumer. The first predetermined temperature may be about 35° F. to about 55° F., and may be about 40° F. to about 50° F. so that the beverage containers stored at the first predetermined temperature are cooled or chilled. The second predetermined temperature may be at or below a freezing point of a beverage within the beverage containers so that the beverage held within the beverage container is supercooled. When a beverage is at or below its freezing point but remains in a liquid state, the beverage is "supercooled." The supercooled beverage will remain in a liquid state until agitated, such as by shaking, dropping, or striking the beverage container, or by opening the cap of the beverage container so as to release carbonation. In one embodiment, the second predetermined temperature may be from about 10° F. to about 32° F., or from about 16° F. to about 25° F., or from about 19° F. to about 25° F. To achieve supercooling of a beverage within second temperature-regulated compartment 382, a beverage may be stored in compartment 382 for at least about one hour to about eight hours, depending upon the particular beverage and the temperature of the compartment 382. A person having ordinary skill in the art will appreciate that the freezing point may differ from one beverage to another and can select an appropriate temperature accordingly. For example, the freezing point of a sweetened, carbonated beverage is generally lower than that of flat, purified water, and as a result, a temperature-regulated compartment for storing the sweetened, carbonated beverage may need to be maintained at a lower temperature than a temperature-regulated compartment for storing purified water.

In embodiments having a first and second temperature-regulated compartment 380, 382, such as beverage container dispenser 300 of FIG. 7, beverage container dispenser 300 may include a user interface 310 for receiving a user input. When beverage container dispenser 300 stores a single type of beverage, the user input may be a temperature of beverage to be dispensed, e.g., chilled or supercooled, such that the consumer may select a chilled beverage or a slush beverage. In some embodiments, beverage container dispenser 300 may store multiple types of beverages, and the user input may be a type of beverage, e.g., soda or diet soda, as well as a temperature of beverage to be dispensed (see FIG. 5).

Figure 8:
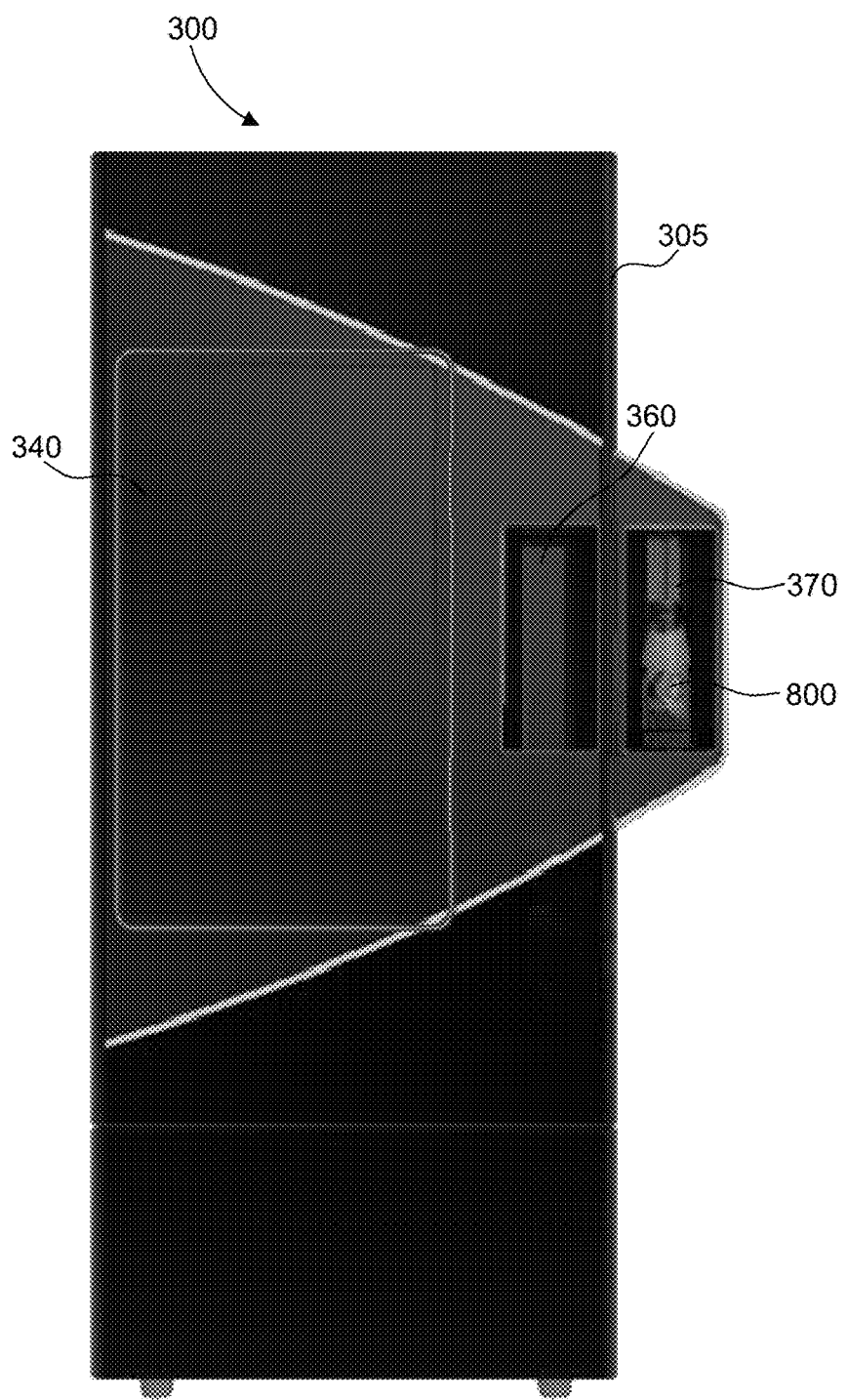
FIG. 8 shows a front perspective view of a beverage container dispenser according to an embodiment.
Figure 9:
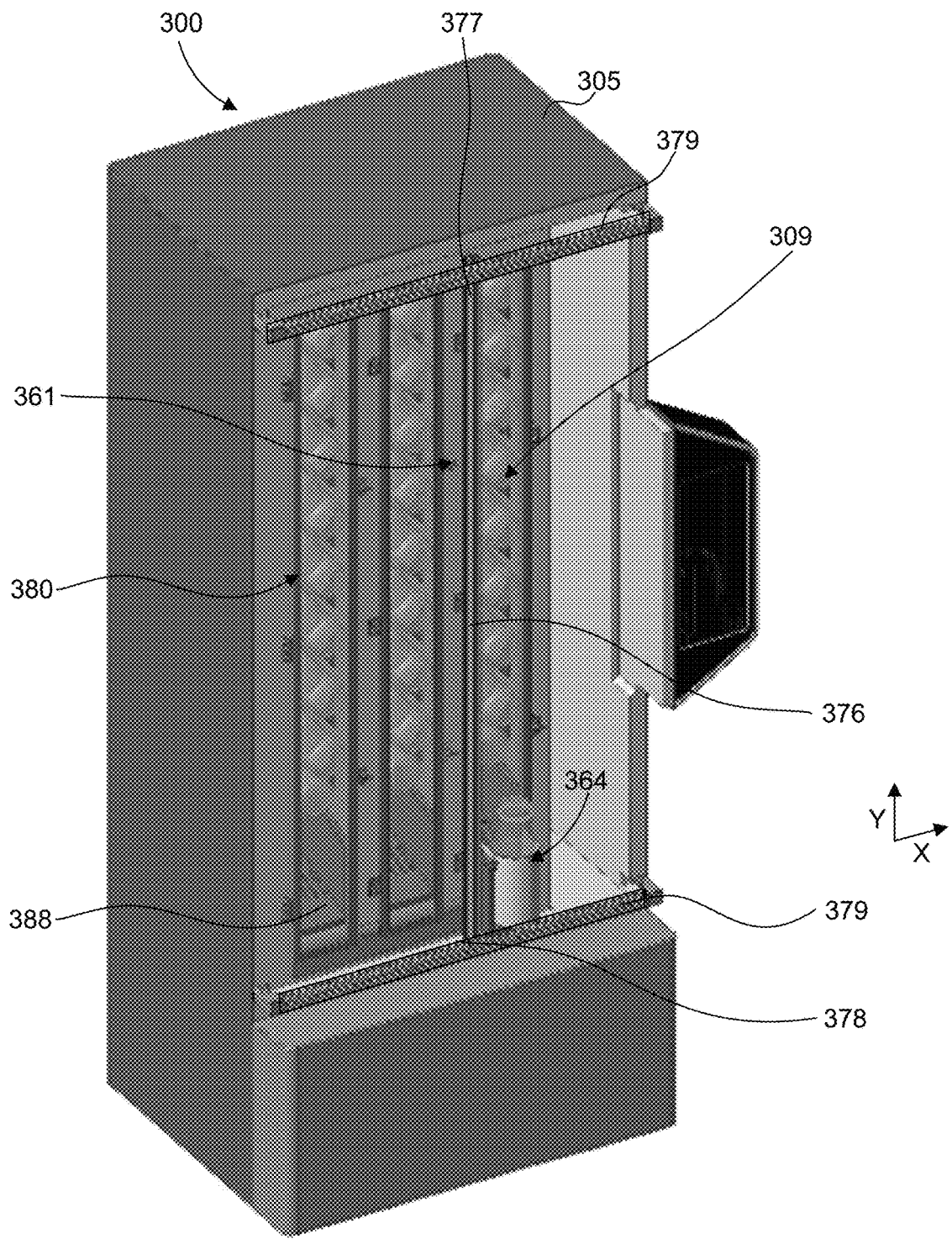
FIG. 9 shows a front perspective view of an interior volume of the beverage container dispenser according to FIG. 8.

In some embodiments, as shown in FIGS. 8-9, beverage container dispenser 300 includes a housing 305 having an enclosed interior volume 309. One or more temperature-regulated compartments 380 are arranged within interior volume 309. It is understood that the temperature-regulated compartment 380 may be a first temperature-regulated compartment for storing beverages at a first predetermined temperature, or a second temperature-regulated compartment for storing beverages at a second predetermined temperature. Temperature-regulated compartment 380 stores beverage containers to be dispensed by beverage container dispenser 300. Beverage container dispenser 300 further includes a delivery mechanism 361 to retrieve a beverage container from temperature-regulated compartment 380 and transport beverage container to a delivery portal 360. Beverage container dispenser 300 may further include an agitator 370 to cause nucleation of a supercooled beverage within a beverage container dispensed by beverage container dispenser 300.

Figure 10:
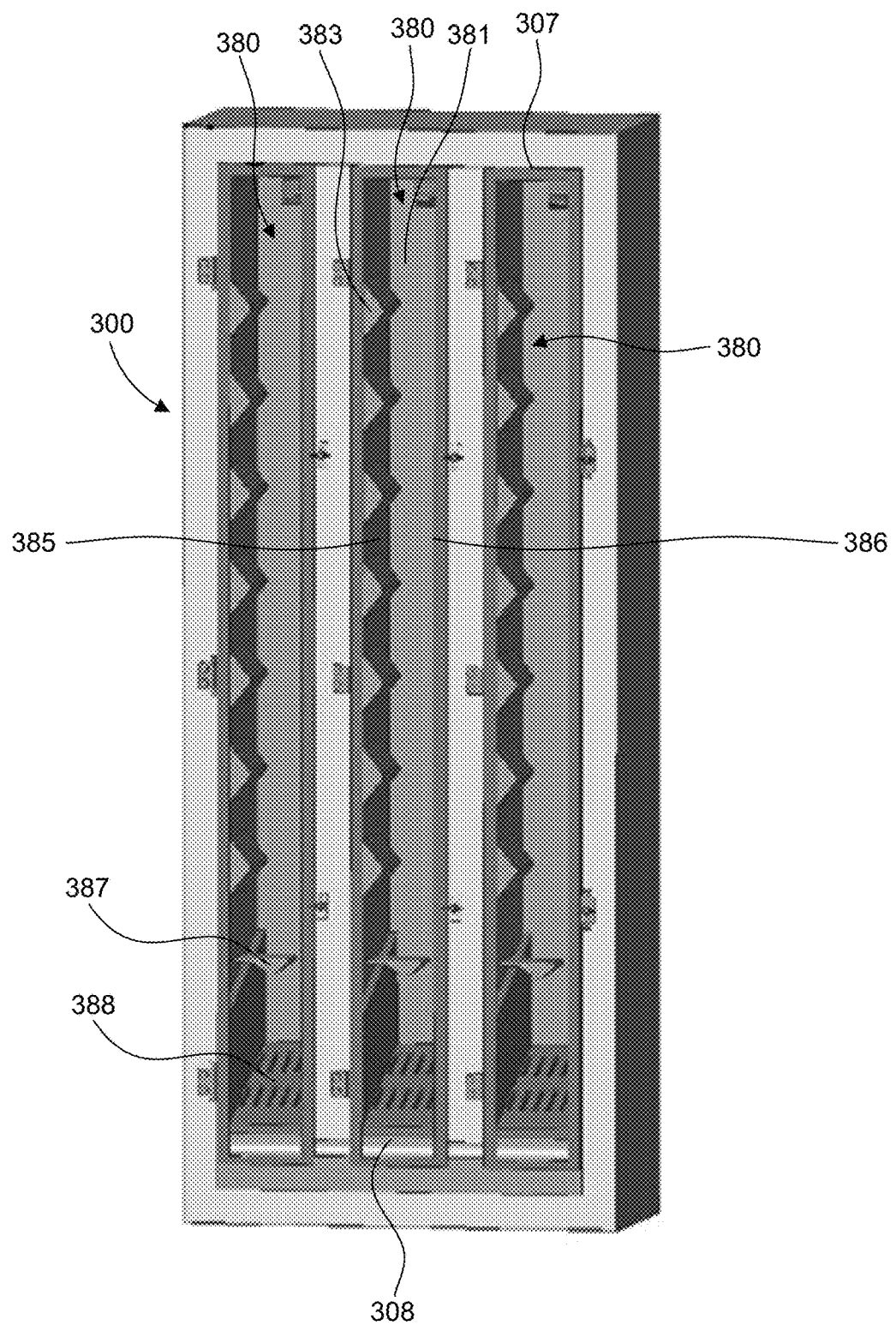
FIG. 10 shows a front perspective view of temperature-regulated compartments of the beverage container dispenser according to FIG. 8.
Figure 11:
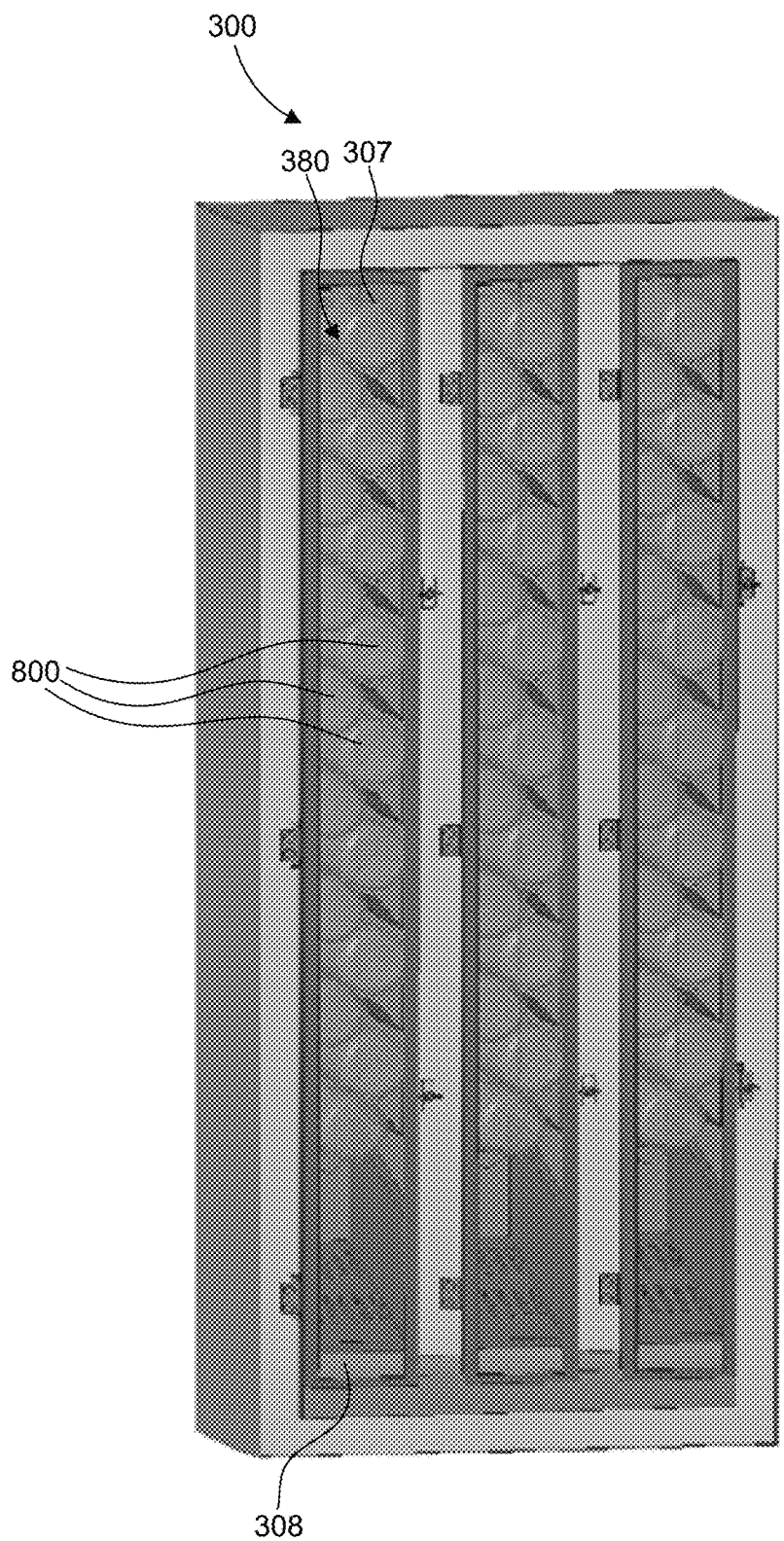
FIG. 11 shows a front perspective view of temperature-regulated compartments of the beverage container dispenser according to FIG. 8 as used to store beverage containers.

In some embodiments, each temperature-regulated compartment 380 defines a pathway 381 such that beverage containers 800 are arranged within temperature-regulated compartment 380 in single file, as shown in FIGS. 10-11, and are dispensed in a sequential manner. Each temperature-regulated compartment 380 may be configured to store one or more beverage containers in a sideways or horizontal orientation. Thus, multiple beverage containers may be arranged in a sideways orientation and stacked vertically on top of one another from lower end 308 to upper end 307 of temperature-regulated compartment 380, such that a sidewall of a first beverage container is adjacent to or in contact with a sidewall of a second beverage container.

In some embodiments, as shown in FIG. 10, pathway 381 may be defined by a first sidewall 385 opposite a second sidewall 386, and one or both sidewalls may include a plurality of protrusions 383 extending therefrom. Temperature-regulated compartment 380 may include a series of protrusions 383 spaced from one another along first sidewall 385 or second sidewall 386 from an upper end 307 of temperature-regulated compartment 380 toward a lower end 308 of temperature-regulated compartment 380. In some embodiments, protrusions 383 extend from first sidewall 385 toward opposing second sidewall 386. In FIG. 10, second sidewall 386 is shown as not having any protrusions 383, however, in some embodiments, second sidewall 386 may also include protrusions 383 that define pathway 381. Protrusions 383 may have any of various configurations, and are shown as having a generally triangular longitudinal cross section. However, in alternate embodiments, protrusions 383 may have alternate cross sectional shapes, such as a semi-circular or trapezoidal cross section, among others. Protrusions 383 may help to bear a portion of the weight of the beverage containers, so that the weight of the beverage containers is not applied directly to other beverage containers in the temperature-regulated compartment 380. Further, the protrusions 383 may help to slow the progression of beverage containers along the pathway 381 so that beverage containers do not free-fall within temperature-regulated compartment 380 when a beverage container is dispensed.

A gate 387 may be arranged at a lower end 308 of temperature-regulated compartment 380 along pathway 381 that prevents beverage containers 800 within pathway 381 from moving to chute 388, as best shown in FIG. 10. Gate 387 may be electrically actuated and operably connected to control unit 350 such that gate 387 is configured to open in order to allow a single beverage container 800 to be released from temperature-regulated compartment 380 in response to a user selection of a beverage container. As the beverage containers are stacked vertically, the beverage container may be released under the force of gravity. Once a beverage container is released to chute 388, gate 387 will return to a closed position so as to prevent further beverage containers from passing to chute 388.

Chute 388 may be positioned at lower end 308 of temperature-regulated compartment 380. Chute 388 may include an inclined surface that is configured to reorient a beverage container stored in a sideways orientation to an upright or upstanding orientation. The inclined surface may have an angle relative to a horizontal plane of about 30° to 80°, about 40° to about 75°, or about 50° to about 70°. Thus, when a beverage container oriented in a horizontal orientation is released onto chute 388, chute 388 serves to reorient beverage container into an upright or upstanding orientation.

In some embodiments, a delivery mechanism 361 is included in beverage container dispenser 300, as shown in FIG. 9. As a supercooled beverage will undergo nucleation and will transform into a solid state upon agitation, a beverage container that is supercooled must be carefully moved to delivery portal 360 so as to avoid agitating the beverage container and causing nucleation of the beverage. If nucleation occurs within beverage container dispenser 100, a consumer will be provided with a slush beverage within the beverage container, but will unable to view of the process of the beverage nucleating, which consumers may find to be entertaining and which provides a unique consumer experience. Delivery mechanism 361 includes a beverage collector 364 for retrieving a beverage container from a temperature-regulated compartment 380 and transporting the beverage container to delivery portal 360. In addition to reorienting the beverage container, chute 388 of temperature-regulated compartment 380 may also serve to direct a beverage container onto beverage collector 364.

Beverage collector 364 is movable from temperature-regulated compartment 380 to delivery portal 360 for retrieving and transporting a beverage container. In some embodiments, beverage collector 364 is positioned on a guide rod 376 having an upper end 377 and a lower end 378 so that guide rod 376 extends parallel to temperature-regulated compartment 380 from lower end 308 to upper end 307 of temperature-regulated compartment 380. Beverage collector 364 is movable along a longitudinal axis of guide rod 376 from upper end 377 to lower end 378 (in a Y-direction). Guide rod 376 is further movably positioned on a pair of tracks 379 arranged at upper end 307 and lower end 308 of temperature-regulated compartments 380. Tracks 379 are arranged transversely to guide rod 376 and are parallel to one another. Guide rod 376 is configured to move in a direction transverse to the longitudinal axis of the guide rod 376 along tracks 379 (in an X-direction). In this way, when a beverage container is dispensed, beverage collector 364 is capable of moving in two directions that are perpendicular to one another, e.g., X- and Y-directions, and can be moved via the guide rod 376 and tracks 379 to retrieve a beverage container from a temperature-regulated compartment 380, and transport the beverage container to delivery portal 360 for dispensing the beverage container to a consumer.

Figure 12:
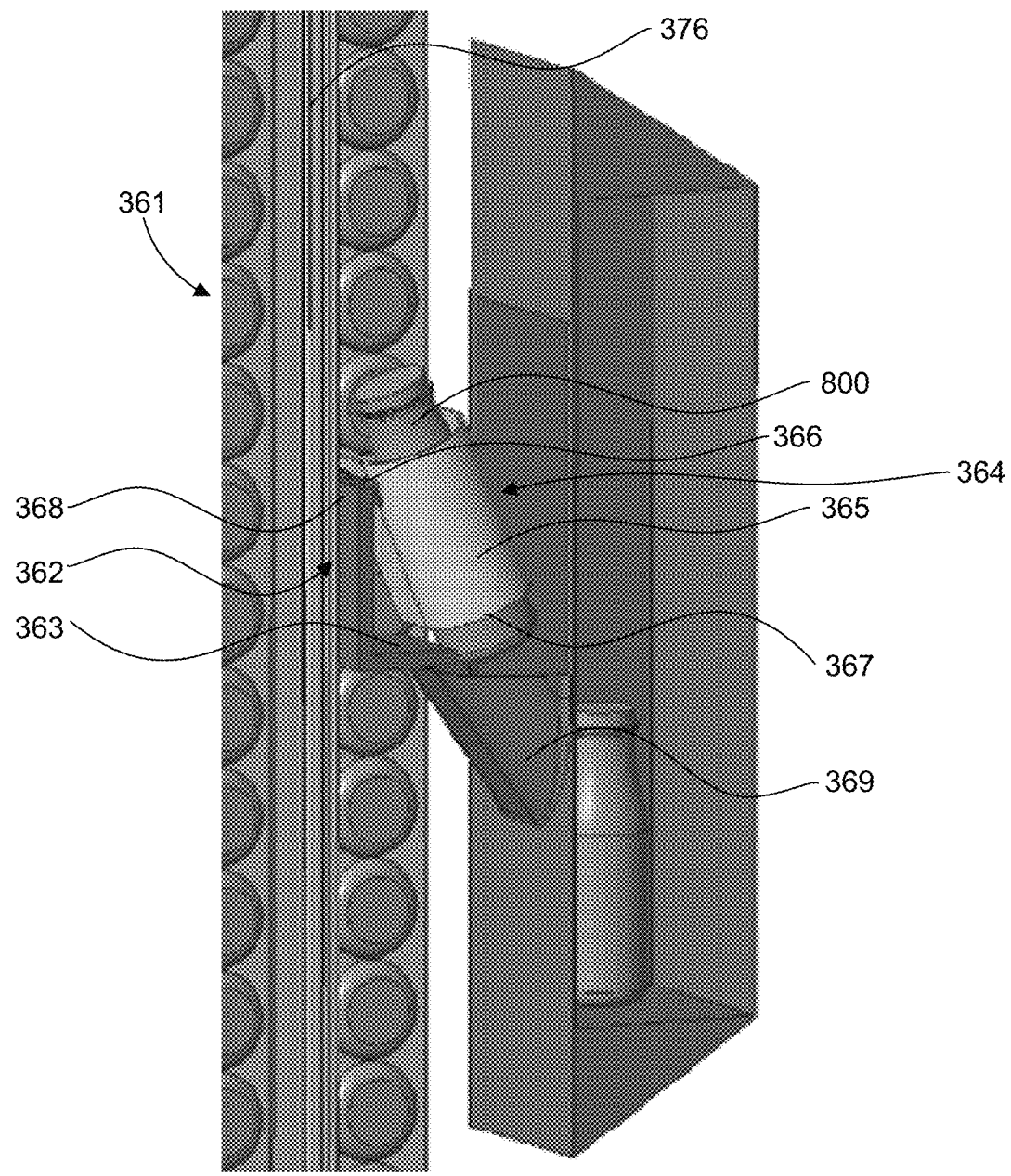
FIG. 12 shows a detail view of a dispensing mechanism of the beverage container dispenser according to FIG. 8.

In some embodiments, beverage collector 364 includes a container support 362 and a movable sidewall 365 as shown for example at FIG. 12. Container support 362 may include a base 363 configured to support a lower end or base of a beverage container 800, and a sidewall 368. Container support 362 may have a generally L-shaped configuration. Sidewall 368 may be integrally formed with base 363. Container support 362 may be movably secured to guide rod 376 via sidewall 368.

Container support 362 may further include movable sidewall 365. Movable sidewall 365 may have a U-shaped or C-shaped transverse cross section such that movable sidewall 365 encircles a portion of beverage container 800 when beverage container 800 is positioned on container support 362. Movable sidewall 365 may be connected to container support 362 via a pivot point 366, such as a hinge, such that movable sidewall 365 is movable from a first position to a second position. In a first position, a portion of movable sidewall 365 rests against sidewall 368 of container support 362 so as to support beverage container on base 363. In a second position, movable sidewall 365 rotates about pivot point 366 in an outward direction away from sidewall 368. As movable sidewall 365 partially encircles beverage container 800, the outward rotation causes beverage container 800 to move off of base 363 and beverage container 800 falls under the force of gravity through an open lower end 367 of movable sidewall 365. Movable sidewall 365 may direct beverage container 800 towards delivery portal 360 which may include an inlet chute 369 configured to guide beverage container 800 into delivery portal 360.

Beverage collector 364 may be movable by a drive mechanism, such as a motor, and operation of delivery mechanism 361 may be determined by a control unit 350 of beverage container dispenser 300. Thus, upon receiving a user selection of a beverage, control unit 350 may cause beverage collector 364 to move to the location of the beverage container in a temperature-regulated compartment 380 to retrieve the beverage container. Gate 387 of temperature-regulated compartment 380 may open to release a beverage container 800 onto chute 388 such that beverage container is reoriented into an upright position and moves onto container support 362 of beverage collector 364 with movable sidewall 365 in the first position. Beverage collector 364 moves along guide rod 376 which moves along tracks 379 such that beverage collector 364 is adjacent to delivery portal 360. Once adjacent to delivery portal 360, movable sidewall 365 is moved into the second position by rotating outwardly from container support 362 such that beverage container 800 is directed into delivery portal 360. By transporting the beverage container in a beverage collector 364, rather than by dropping the beverage container such that beverage container falls freely to delivery portal 360, nucleation of the beverage within the beverage container is avoided.

Figure 14:
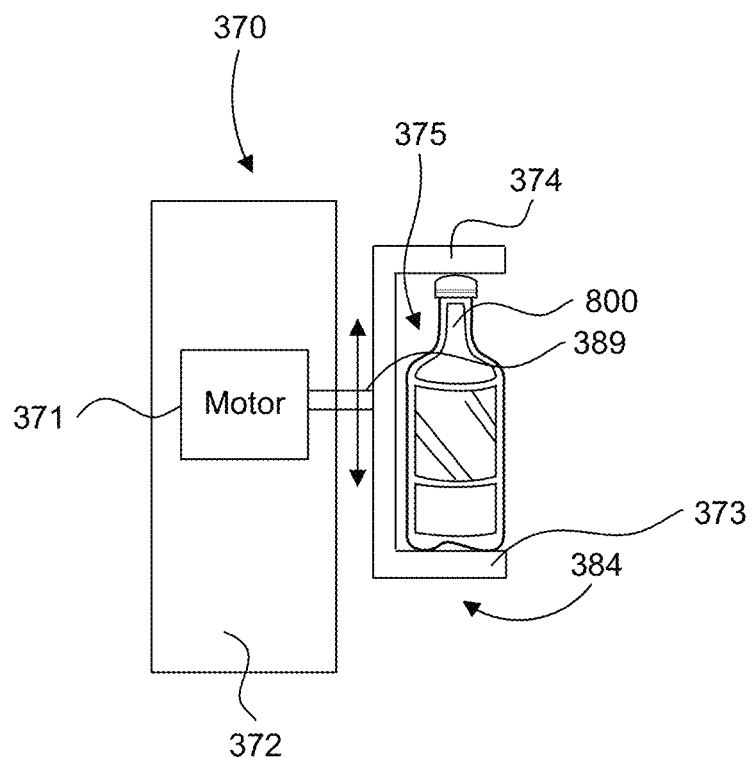
FIG. 14 shows a view of an agitator of a beverage container dispenser according to an embodiment.

In some embodiments, beverage container dispenser 300 may further include an agitator 370 for causing a beverage container containing a supercooled beverage to undergo nucleation, as shown for example at FIG. 14. Agitator 370 is configured to cause nucleation of a beverage within the beverage container dispensed by beverage container dispenser 300. Thus, when a consumer selects to dispense a beverage container from second temperature-regulated compartment 382, such that the dispensed beverage is at a temperature at or below the freezing point of beverage, the consumer may use the agitator 370 so as to provide a slush beverage and view the process of the beverage nucleating from a liquid to a partial solid.

Agitator 370 may be integrally connected to or formed as part of beverage container dispenser 300. For example, agitator 370 may be built-into a housing 305 of beverage container dispenser 300 or may be connected to housing 305. In some embodiments, agitator 370 is a separate device from beverage container dispenser 300 and may positioned be adjacent thereto.

In some embodiments, agitator 370 includes a beverage container frame 384 defining a beverage container receiving area 375. Beverage container frame 384 is configured to securely hold a beverage container 800 within beverage container receiving area 375. In some embodiments, beverage container frame 384 may include a lower support 373 and an upper support 374, wherein lower support 373 is configured to support a base of beverage container 800 and upper support 374 is configured to support a lid or upper end of beverage container 800 so that beverage container 800 is firmly held between upper and lower supports 374, 373. Beverage container frame 384 is configured to apply a shaking motion to beverage container 800. Beverage container frame 384 may rapidly move in an up-and-down motion, a side-to-side motion, or a combination thereof. Thus, beverage container frame 384 may apply a circular shaking motion to beverage container 800. Alternatively, beverage container frame 384 may be configured to move in a rocking motion by pivoting about a fixed point. To impart a shaking motion on beverage container, beverage container frame 384 may be operably connected to a drive mechanism, such as a motor 371, by an arm or linkage 389. Motor 371 may be contained within a housing 372, wherein the housing 372 may be separate from or integrated with a housing 305 of beverage container dispenser 300.

Figure 15:
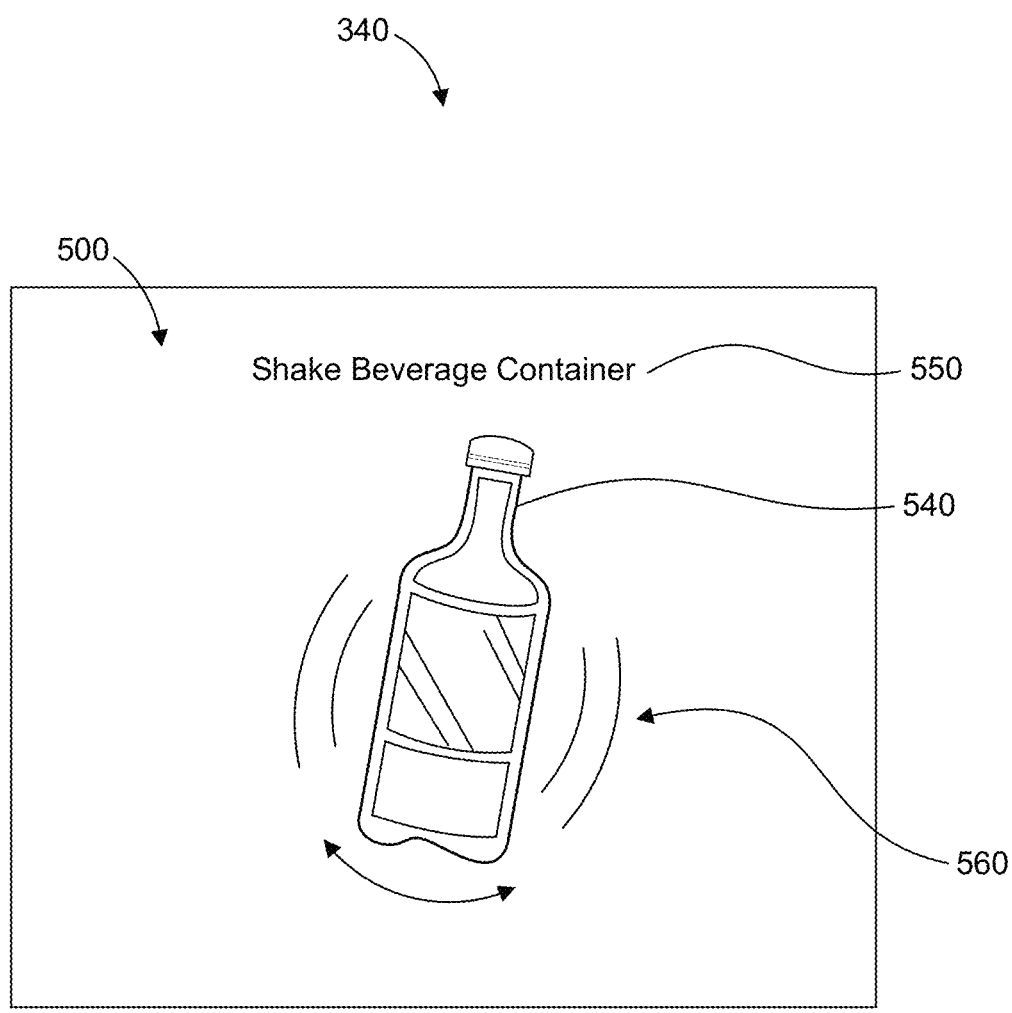
FIG. 15 shows a graphical user interface for a beverage container dispenser according to an embodiment.

Upon dispensing a beverage container containing a beverage at a second predetermined temperature, e.g., a temperature at or below a freezing point of the beverage within the dispensed beverage container, display 340 of beverage container dispenser 300 may display instructions for nucleating the beverage, as shown in FIG. 15. The display 340 may include a graphical user interface 500 that illustrates manual shaking 560 of the beverage container 540 to cause nucleation of the beverage within the container. The instructions may include text instructions 550 and/or an image or video instruction, such as an animation, for causing nucleation of the beverage within the beverage container 540. In embodiments of beverage container dispenser 300 having an agitator 370, the instructions may demonstrate or explain operation of agitator 370. For example, instructions for operating the agitator 370 may include a step of inserting and securing the dispensed beverage container in agitator 370 and operating a control for beginning operation of agitator 370. Agitator 370 may be configured to automatically agitate a beverage container inserted into agitator 370 or a consumer may have to operate a control to cause agitator 370 to begin operation.

Figure 16:
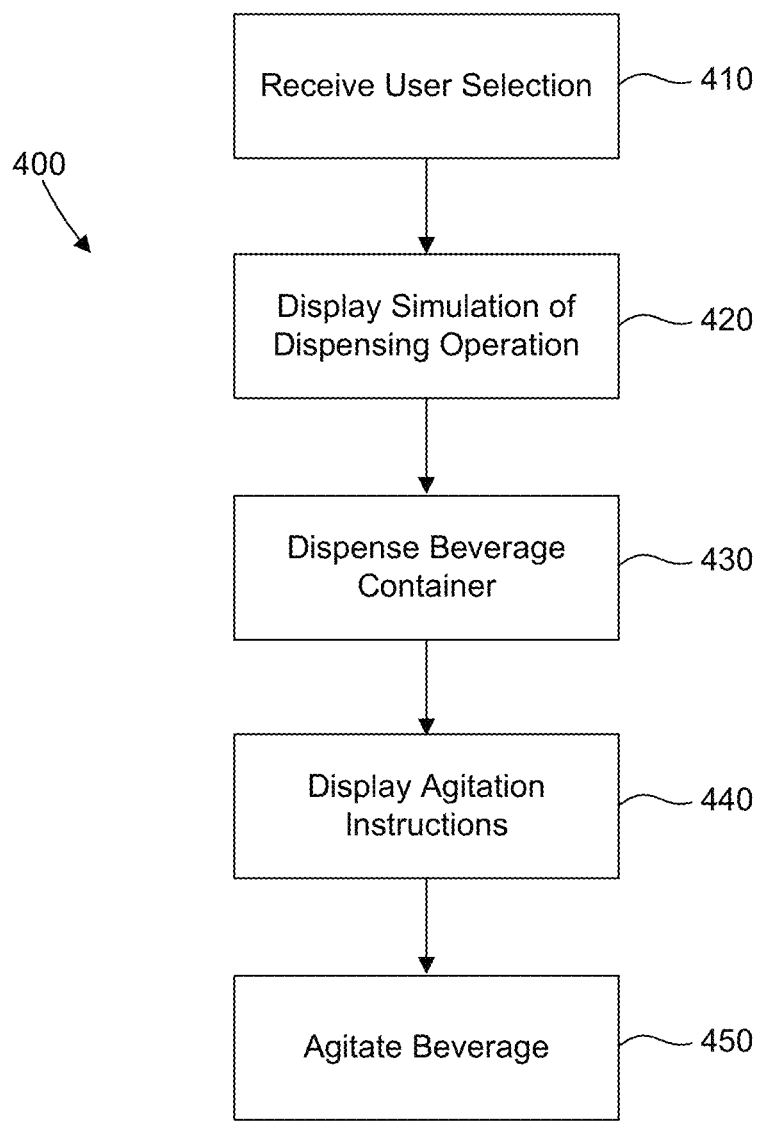
FIG. 16 shows a flow chart of a method for providing a slush beverage in a beverage container according to an embodiment.

A process for dispensing a slush beverage in a beverage container is shown for example at FIG. 16. The process for dispensing a slush beverage 400 includes receiving a user selection 410 for a beverage and/or a temperature of beverage to be dispensed. The user selection may be received by a user interface of a beverage container dispenser, such as a touch-screen display of the beverage container dispenser. The user selection may be made in part by inserting a beverage container into an inlet port of the beverage dispenser, wherein the beverage container dispenser may detect the type of beverage within the beverage container. Beverage container dispenser may display a simulation of a beverage dispensing operation 420 upon receipt of the user selection. Upon completion of the simulation, beverage container dispenser may dispense a beverage container 430 corresponding to the user selection. If the consumer selected to dispense a beverage at a temperature that is at or below freezing point of the beverage, beverage dispenser may further display instructions for agitating the beverage 440. The instructions may include steps for manually agitating the beverage, or may include steps for operating an agitator of the beverage container dispenser. The consumer may then agitate the beverage 450 according to the instructions presented on the display, such as by inserting the beverage container into an agitator of the beverage dispenser and operating the agitator to cause nucleation of the beverage dispenser.

In any of the embodiments described herein, a beverage container dispenser may further include a payment system for receiving a payment from a user prior to dispensing a beverage container to the consumer. The payment system may include any of various means for accepting payment from a user, including but not limited to, a slot for receiving paper money, e.g., dollar bills, coins, or tokens; a credit card reader for reading credit cards, debit cards, gift cards, and the like; or a mobile payment scanner for receiving payment made by an application on a smartphone.

Figure 17:
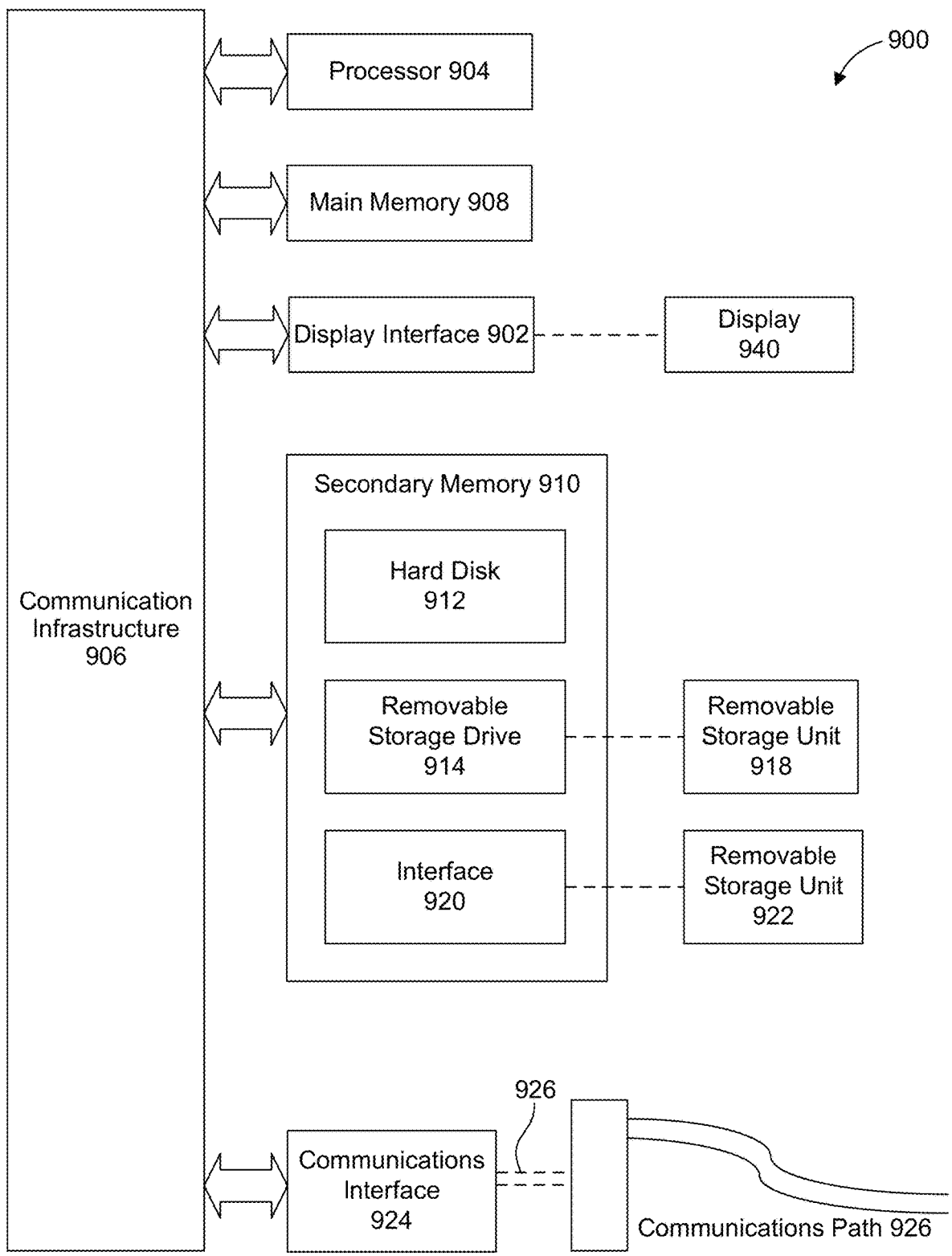
FIG. 17 shows a schematic block diagram of an exemplary computer system in which embodiments may be implemented.

FIG. 17 illustrates an exemplary computer system 900 in which embodiments, or portions thereof, may be implemented as computer-readable code. A control unit 150, 250, 350 as discussed herein may be a computer system having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display 940.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A method for dispensing a beverage container from a beverage dispenser, the method comprising:
    receiving a user selection of a beverage, wherein receiving the user selection comprises receiving a first beverage container corresponding to a beverage selection of a user into an inlet port of the beverage dispenser;
    displaying, upon receipt of the user selection, a simulation of a beverage container dispensing operation on a display, wherein the simulation depicts a beverage container based on the user selection; and
    dispensing, upon completion of the simulation, a second beverage container corresponding to the user selection.

2. The method of claim 1, wherein the simulation comprises a set runtime, and wherein dispensing the second beverage container occurs at the end of the set runtime.

3. The method of claim 1, wherein the simulation comprises a beverage container representation that moves from a first portion of the display to a second portion of the display near a delivery portal of the beverage dispenser, and wherein dispensing the second beverage container comprises dispensing the second beverage container when the beverage container representation reaches the second portion of the display.

4. The method of claim 1, further comprising detecting indicia of the first beverage container received by the beverage dispenser in order to determine a beverage type, and wherein the second beverage container is the same beverage type as the first beverage container.

5. The method of claim 1, wherein the display is arranged on the beverage dispenser.

6. The method of claim 1, wherein the simulation depicts the beverage container moving on the display towards a delivery portal of the beverage dispenser.

7. The method of claim 1, wherein the simulation depicts formation of a slush beverage within the beverage container.

8. The method of claim 1, wherein dispensing the second beverage container comprises dispensing the second beverage container from a temperature-regulated compartment of the beverage dispenser.

9. A method for providing a slush beverage in a beverage container, the method comprising:
    receiving a user selection of a beverage by a beverage container dispenser;
    displaying, on a display of the beverage container dispenser, a simulation of a beverage container being dispensed;
    dispensing a beverage container corresponding to the user selection from a first temperature-regulated compartment of the beverage container dispenser to a delivery portal of the beverage container dispenser, wherein the first temperature-regulated compartment is configured to store the beverage container at or below a freezing point of the beverage such that the beverage is supercooled; and
    displaying, on the display of the beverage container dispenser, an instruction for causing nucleation of the supercooled beverage to form a slush beverage within the beverage container.

10. The method of claim 9, wherein the simulation further comprises a depiction of the beverage container undergoing a process for cooling the beverage container.

11. The method of claim 9, wherein the beverage container dispenser further comprises an agitator configured to cause nucleation of the beverage within the beverage container, and wherein displaying an instruction for causing nucleation comprises an instruction for operating the agitator.

12. The method of claim 9, wherein displaying an instruction for causing nucleation comprises displaying an instruction to shake the beverage container.

13. The method of claim 9, wherein displaying an instruction for causing nucleation comprises displaying a video demonstrating a process for causing nucleation.

14. The method of claim 9, wherein receiving a user selection comprises receiving a user selection by means of a user interface.

15. The method of claim 14, wherein the user interface and the display comprise a touch-screen display.

16. A method for dispensing a beverage container to a consumer, the method comprising:

receiving, in an inlet port of a beverage container dispenser, a first beverage container containing a beverage corresponding to a beverage selection of a user;

displaying, upon receipt of the first beverage container into the inlet port of the beverage container dispenser, a simulation of a beverage container dispensing operation on a display of the beverage container dispenser; and dispensing a second beverage container from a temperature-regulated compartment of the beverage container dispenser, wherein the second beverage container corresponds to the beverage selection of the user.

17. The method of claim 16, further comprising detecting a type of beverage of the first beverage container by a detector of the beverage container dispenser.

18. The method of claim 17, wherein detecting the type of beverage of the first beverage container comprises detecting indicia on the first beverage container by the detector, wherein the indicia corresponds to the type of beverage of the first beverage container.

19. The method of claim 16, wherein the simulation depicts a beverage container moving from a portion of the display adjacent to the inlet port toward a portion of the display adjacent to a delivery portal of the beverage container dispenser.

20. A method for dispensing a beverage container from a beverage dispenser, the method comprising:

receiving a user selection of a beverage;

displaying, upon receipt of the user selection, a simulation of a beverage container dispensing operation on a display, wherein the simulation comprises a beverage container representation that is based on the user selection and that moves from a first portion of the display to a second portion of the display near a delivery portal of the beverage dispenser, and wherein the simulation depicts formation of a slush beverage within the beverage container; and dispensing a beverage container corresponding to the user selection when the beverage container representation reaches the second portion of the display.

21. The method of claim 20, wherein depicting formation of a slush beverage comprises depicting the beverage container representation being cooled and agitated.

22. The method of claim 20, wherein the beverage container is dispensed from a temperature-regulated compartment configured to store the beverage container at or below a freezing point of the beverage.

23. A method for dispensing a beverage container from a beverage dispenser, the method comprising:

receiving a user selection of a beverage;

displaying, upon receipt of the user selection, a simulation of a beverage container dispensing operation on a display, wherein the simulation comprises a beverage container representation that moves from a first portion of the display to a second portion of the display near a delivery portal of the beverage dispenser; and dispensing a beverage container corresponding to the user selection after the beverage container representation reaches the second portion of the display.

24. The method of claim 23, wherein receiving the user selection comprises receiving the user selection from a user interface of the beverage dispenser.

\* \* \* \* \*